US012658968B2

(12) United States Patent
Banerjee et al.

(10) Patent No.: US 12,658,968 B2
(45) Date of Patent: Jun. 16, 2026

(54) METHODS, SYSTEMS, AND APPARATUS TO REDUCE RINGING IN A DIFFERENTIAL OUTPUT OF A TRANSCEIVER

(71) Applicant: Texas Instruments Incorporated, Dallas, TX (US)

(72) Inventors: Deep Banerjee, Bangalore (IN); Lokesh Kumar Gupta, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 56 days.

(21) Appl. No.: 18/932,171

(22) Filed: Oct. 30, 2024

(65) Prior Publication Data

US 2025/0392340 A1 Dec. 25, 2025

(30) Foreign Application Priority Data

Jun. 25, 2024 (IN) .............................. 202441048527

(51) Int. Cl.
    *H04B 1/40*       (2015.01)
    *H04L 12/40*     (2006.01)
(52) U.S. Cl.
    CPC ......... *H04B 1/40* (2013.01); *H04L 12/40045* (2013.01); *H04L 2012/40215* (2013.01)
(58) Field of Classification Search
    CPC ................ H04B 1/40; H04L 12/40045; H04L 2012/40215
    See application file for complete search history.

(56) References Cited

U.S. PATENT DOCUMENTS

2006/0170451 A1 * 8/2006 Jordanger ........ H03K 19/00346
                          326/34
2014/0156893 A1 * 6/2014 Monroe ................ G06F 13/364
                          710/117

2017/0257140 A1 9/2017 de Haas et al.
2019/0288870 A1 9/2019 de Haas et al.
2021/0167989 A1 6/2021 Broughton et al.
2023/0353185 A1 11/2023 Banerjee et al.

OTHER PUBLICATIONS

Texas Instruments Incorporated, "TCAN1462-Q1 and TCAN1462V-Q1 Automotive Fault-Protected CAN FD Transceiver with Signal Improvement Capability (SIC) and Standby Mode," Datasheet, Jun. 2022, 41 pages.
Wikipedia, "CAN bus," retrieved on Aug. 28, 2024, from https://en.wikipedia.org/wiki/CAN_bus, 28 pages.

* cited by examiner

*Primary Examiner* — David S Huang
(74) *Attorney, Agent, or Firm* — Xianghui Huang; Frank D. Cimino

(57) ABSTRACT

An example transceiver includes a resistor having a first terminal and a second terminal coupled to a communication bus terminal. The transceiver includes a first transistor having a control terminal, a first terminal coupled to the first terminal of the resistor, and a second terminal coupled to a common mode voltage terminal. The transceiver includes a second transistor having a control terminal, a first terminal coupled to the second terminal of the resistor, and a second terminal coupled to the common mode voltage terminal. The transceiver includes a first driver having a first terminal coupled to a ground terminal, a second terminal coupled to the second terminal of the first transistor and the second terminal of the second transistor, a third terminal coupled to the control terminal of the first transistor, and a fourth terminal coupled to the control terminal of the second transistor.

21 Claims, 12 Drawing Sheets

600

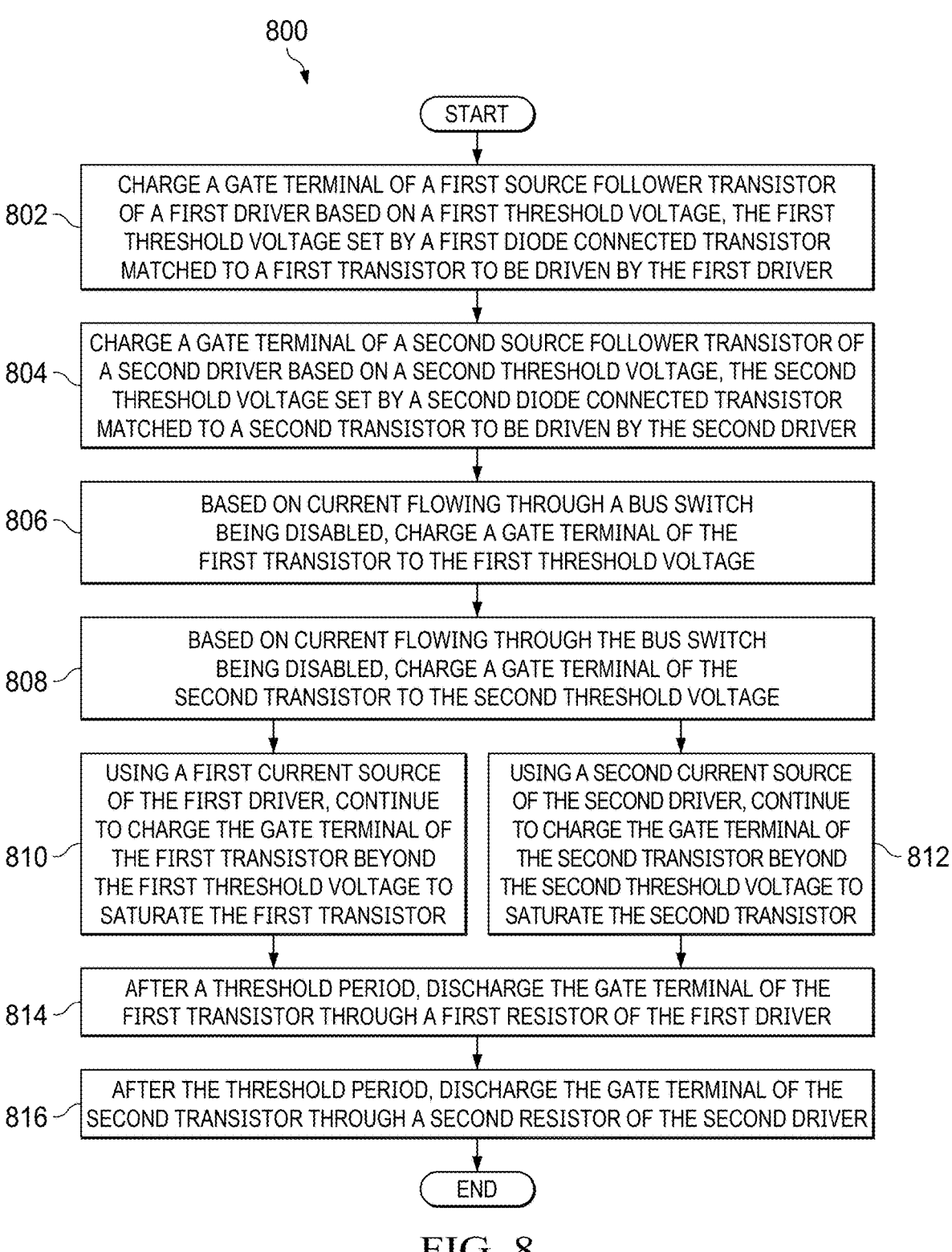

800

START

802 — CHARGE A GATE TERMINAL OF A FIRST SOURCE FOLLOWER TRANSISTOR OF A FIRST DRIVER BASED ON A FIRST THRESHOLD VOLTAGE, THE FIRST THRESHOLD VOLTAGE SET BY A FIRST DIODE CONNECTED TRANSISTOR MATCHED TO A FIRST TRANSISTOR TO BE DRIVEN BY THE FIRST DRIVER

804 — CHARGE A GATE TERMINAL OF A SECOND SOURCE FOLLOWER TRANSISTOR OF A SECOND DRIVER BASED ON A SECOND THRESHOLD VOLTAGE, THE SECOND THRESHOLD VOLTAGE SET BY A SECOND DIODE CONNECTED TRANSISTOR MATCHED TO A SECOND TRANSISTOR TO BE DRIVEN BY THE SECOND DRIVER

806 — BASED ON CURRENT FLOWING THROUGH A BUS SWITCH BEING DISABLED, CHARGE A GATE TERMINAL OF THE FIRST TRANSISTOR TO THE FIRST THRESHOLD VOLTAGE

808 — BASED ON CURRENT FLOWING THROUGH THE BUS SWITCH BEING DISABLED, CHARGE A GATE TERMINAL OF THE SECOND TRANSISTOR TO THE SECOND THRESHOLD VOLTAGE

810 — USING A FIRST CURRENT SOURCE OF THE FIRST DRIVER, CONTINUE TO CHARGE THE GATE TERMINAL OF THE FIRST TRANSISTOR BEYOND THE FIRST THRESHOLD VOLTAGE TO SATURATE THE FIRST TRANSISTOR

USING A SECOND CURRENT SOURCE OF THE SECOND DRIVER, CONTINUE TO CHARGE THE GATE TERMINAL OF THE SECOND TRANSISTOR BEYOND THE SECOND THRESHOLD VOLTAGE TO SATURATE THE SECOND TRANSISTOR — 812

814 — AFTER A THRESHOLD PERIOD, DISCHARGE THE GATE TERMINAL OF THE FIRST TRANSISTOR THROUGH A FIRST RESISTOR OF THE FIRST DRIVER

816 — AFTER THE THRESHOLD PERIOD, DISCHARGE THE GATE TERMINAL OF THE SECOND TRANSISTOR THROUGH A SECOND RESISTOR OF THE SECOND DRIVER

END

FIG. 8

METHODS, SYSTEMS, AND APPARATUS TO REDUCE RINGING IN A DIFFERENTIAL OUTPUT OF A TRANSCEIVER

CROSS-REFERENCE TO RELATED APPLICATION

This patent application claims the benefit of and priority to Indian Provisional Patent Application No. 202441048527 filed Jun. 25, 2024, which application is hereby incorporated herein by reference in its entirety.

TECHNICAL FIELD

This description relates generally to communication and, more particularly, to methods, systems, and apparatus to reduce ringing in a differential output of a transceiver.

BACKGROUND

The controller area network (CAN) standard defines one or more protocols for communication over a bus. The CAN standard has been adopted for use in many contexts such as passenger vehicles, trucks, buses, agricultural equipment, industrial automation and mechanical control, building automation, maritime applications, and robotics. In vehicles, CAN protocols govern communication between electronic control units (ECUs).

SUMMARY

For methods, systems, and apparatus to reduce ringing in a transceiver, an example transceiver includes a resistor having a first terminal and a second terminal coupled to a communication bus terminal. The transceiver includes a first transistor having a control terminal, a first terminal coupled to the first terminal of the resistor, and a second terminal coupled to a common mode voltage terminal. The transceiver includes a second transistor having a control terminal, a first terminal coupled to the second terminal of the resistor, and a second terminal coupled to the common mode voltage terminal. The transceiver includes a first driver having a first terminal coupled to a ground terminal, a second terminal coupled to the second terminal of the first transistor and the second terminal of the second transistor, a third terminal coupled to the control terminal of the first transistor, and a fourth terminal coupled to the control terminal of the second transistor. Other examples are described.

For methods, systems, and apparatus to reduce ringing in a transceiver, an example apparatus includes a first resistor having a first terminal and a second terminal coupled to a voltage terminal. The apparatus includes a first transistor having a control terminal, a first terminal, and a second terminal, the first terminal of the first transistor coupled to the control terminal of the first transistor and the first terminal of the first resistor. The apparatus includes a second transistor having a control terminal, a first terminal coupled to the control terminal of the second transistor and the second terminal of the first transistor, and a second terminal to be coupled to a source terminal of a third transistor. The apparatus includes a switch having a control terminal, a first terminal, and a second terminal coupled to the voltage terminal. The apparatus includes a current source having a first terminal coupled to the first terminal of the switch and a second terminal to be coupled to a gate terminal of the third transistor. The apparatus includes a fourth transistor having a control terminal coupled to the control terminal of the first transistor, a first terminal coupled to the first terminal of the switch, and a second terminal to be coupled to the gate terminal of the third transistor. The apparatus includes a second resistor having a first terminal to be coupled to the source terminal of the third transistor and a second terminal to be coupled to the gate terminal of the third transistor. Other examples are described.

For methods, systems, and apparatus to reduce ringing in a transceiver, an example system includes a current source having a control terminal and a first terminal. The system includes a current mirror having a first terminal and a second terminal coupled to the first terminal of the current source. The system includes a first transistor having a control terminal, a first terminal coupled to a communication bus terminal, and a second terminal coupled to the first terminal of the current mirror. The system includes a first driver having a control terminal, a first terminal coupled to a supply terminal, and a second terminal coupled to the control terminal of the first transistor. The system includes a resistor having a first terminal and a second terminal coupled to the first terminal of the first transistor. The system includes a second transistor having a control terminal, a first terminal coupled to the first terminal of the resistor, and a second terminal coupled to a common mode voltage terminal. The system includes a second driver having a control terminal, a first terminal coupled to a ground terminal, a second terminal coupled to the second terminal of the second transistor, and a third terminal coupled to the control terminal of the second transistor. The system includes a third transistor having a control terminal, a first terminal coupled to the common mode voltage terminal, and a second terminal coupled to the second terminal of the resistor. The system includes a third driver having a control terminal, a first terminal coupled to the supply terminal and a second terminal coupled to the control terminal of the third transistor. The system includes control circuitry having a first output terminal coupled to the control terminal of the first driver, a second output terminal coupled to the control terminal of the second driver, a third output terminal coupled to the control terminal of the third driver, and a fourth output terminal coupled to the control terminal of the current source. Other examples are described.

BRIEF DESCRIPTION OF THE DRAWINGS

FIG. 8 is a flowchart representative of at least one of example machine-readable instructions or example operations that may be at least one of executed, instantiated, or performed using example programmable circuitry of the third SiC driver of FIG. 7A and the fourth SiC driver of FIG. 7B.

Figure 1:
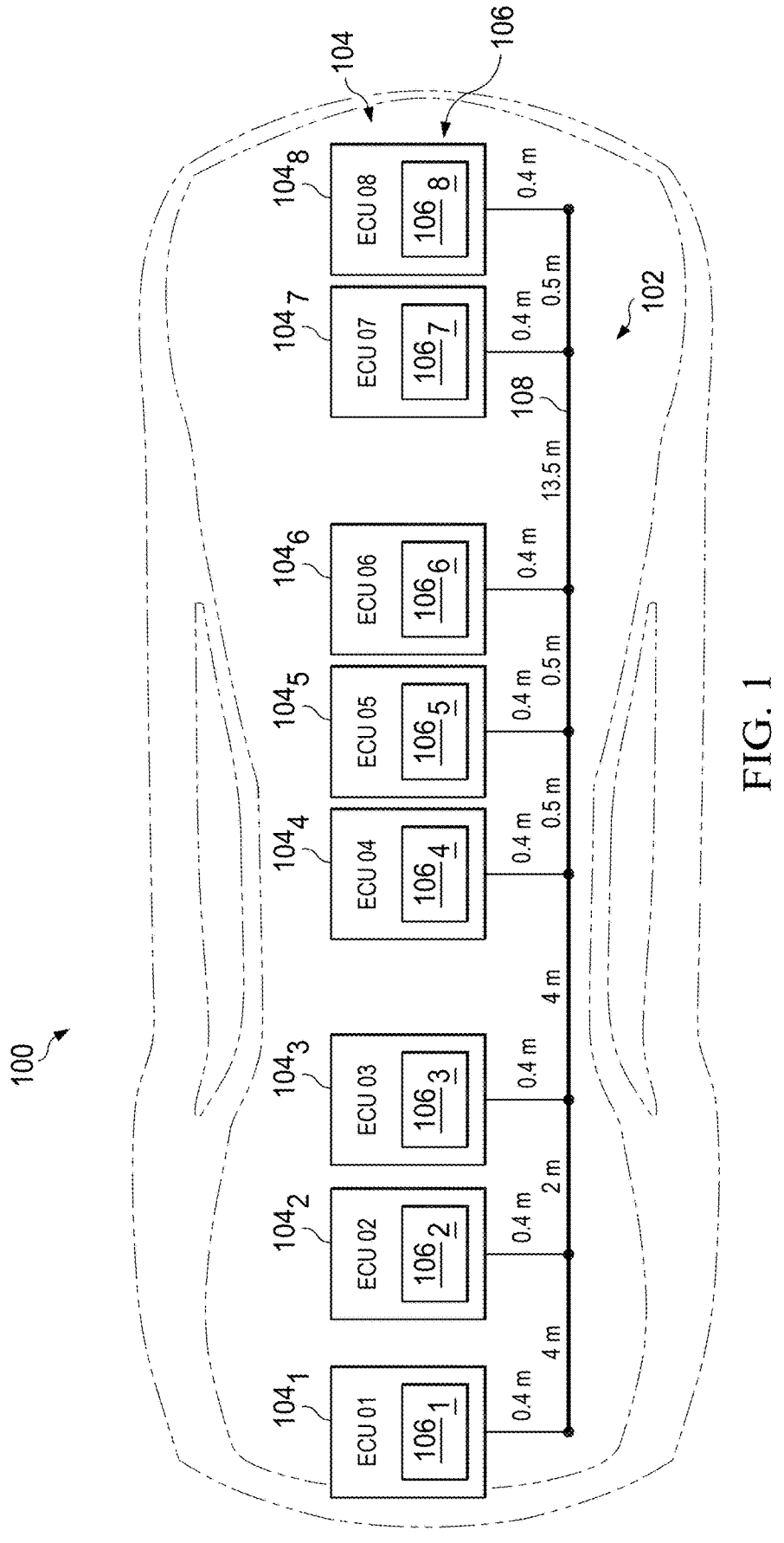
FIG. 1 is a block diagram of an example vehicle including an example controller area network (CAN).

The drawings are not necessarily to scale. Generally, the same reference numbers in the drawing(s) and this description refer to the same or similar (at least one of functional or structural) features or parts. Although the drawings show regions with clean lines and boundaries, some or all of these lines and boundaries may be idealized. In reality, the boundaries or lines may be unobservable, blended, or irregular.

DETAILED DESCRIPTION

FIG. 1 is a block diagram of an example vehicle 100 including an example controller area network (CAN) 102. In FIG. 1, the vehicle 100 is a passenger car. In other examples, the vehicle 100 is a truck, a bus, agricultural equipment, an industrial vehicle, a boat, or a robot. In some examples, the vehicle 100 is another type of vehicle.

The CAN 102 of FIG. 1 includes example electronic control units (ECUs) 104. In FIG. 1, the CAN 102 is implemented in compliance with the CAN standard, also referred to as International Organization for Standardization (ISO) 11898 parts 1, 2, and 3. The CAN 102 of FIG. 1 can include any number of ECUs. For example, the ECUs 104 include a first example ECU $104_1$, a second example ECU $104_2$, a third example ECU $104_3$, a fourth example ECU $104_4$, a fifth example ECU $104_5$, a sixth example ECU $104_6$, a seventh example ECU $104_7$, and an eighth example ECU $104_8$. In FIG. 1, each of the ECUs 104 can have different cable lengths (e.g., between 0.4 meters (m), 13.5 m, etc.) between other components of the CAN 102 (e.g., signal repeaters, redrivers, etc.).

Each of the ECUs 104 of FIG. 1 includes an example transceiver 106. For example, the ECU $104_1$ includes a first example transceiver 1061. The ECU $104_2$ includes a second example transceiver $106_2$. The ECU $104_3$ includes a third example transceiver $106_3$. The ECU $104_4$ includes a fourth example transceiver 1064. The ECU $104_5$ includes a fifth example transceiver $106_5$. The ECU $104_6$ includes a sixth example transceiver $106_6$. The ECU $104_7$ includes a seventh example transceiver $106_7$. The ECU $104_8$ includes an eighth example transceiver $106_8$. In FIG. 1, the transceiver 106 of respective ones of the ECUs 104 communicates using a CAN protocol. For example, the CAN 102 includes an example communication bus 108 that carries two signals, a CAN high signal and a CAN low signal, as set forth in the CAN standard.

In FIG. 1, the transceiver 106 of respective ones of the ECUs 104 can drive the CAN high signal and the CAN low signal to a dominant state or pull the CAN high signal and the CAN low signal to a recessive state. In the dominant state, the CAN high signal is greater than the CAN low signal, which creates a positive differential voltage between the CAN high signal and the can low signal. In the recessive state, the CAN high signal is less than or equal to the CAN low signal. According to a CAN protocol, the transceiver 106 of respective ones of the ECUs 104 drives the communication bus 108 to a dominant state to encode a zero and pulls the communication bus 108 to the recessive state to encode a one. For example, to transmit a zero, the transceiver 106 drives the communication bus 108 above a first threshold voltage and to transmit a one, the transceiver 106 pulls the communication bus 108 below a second threshold voltage.

Due to the complex design of modern CANs, ringing can occur on the communication bus of a CAN (e.g., the communication bus 108) as CAN transceivers transition between dominant and recessive states. For example, because capacitive and inductive loads on the communication bus of a CAN discharge as the state of the communication transitions, ringing can occur. For lower data rates (e.g., between 500 kilobits per second (kbps) and two megabits per second (Mbps)), ringing is permissible as long as a transceiver does not glitch. For example, at lower data rates, ringing only results in some bit-width distortion. However, the bit-width distortion does not impact, or minimally impacts, overall communication. At higher data rates (e.g., between five and eight Mbps), ringing is more likely to cause corruption of data.

Figure 2A:
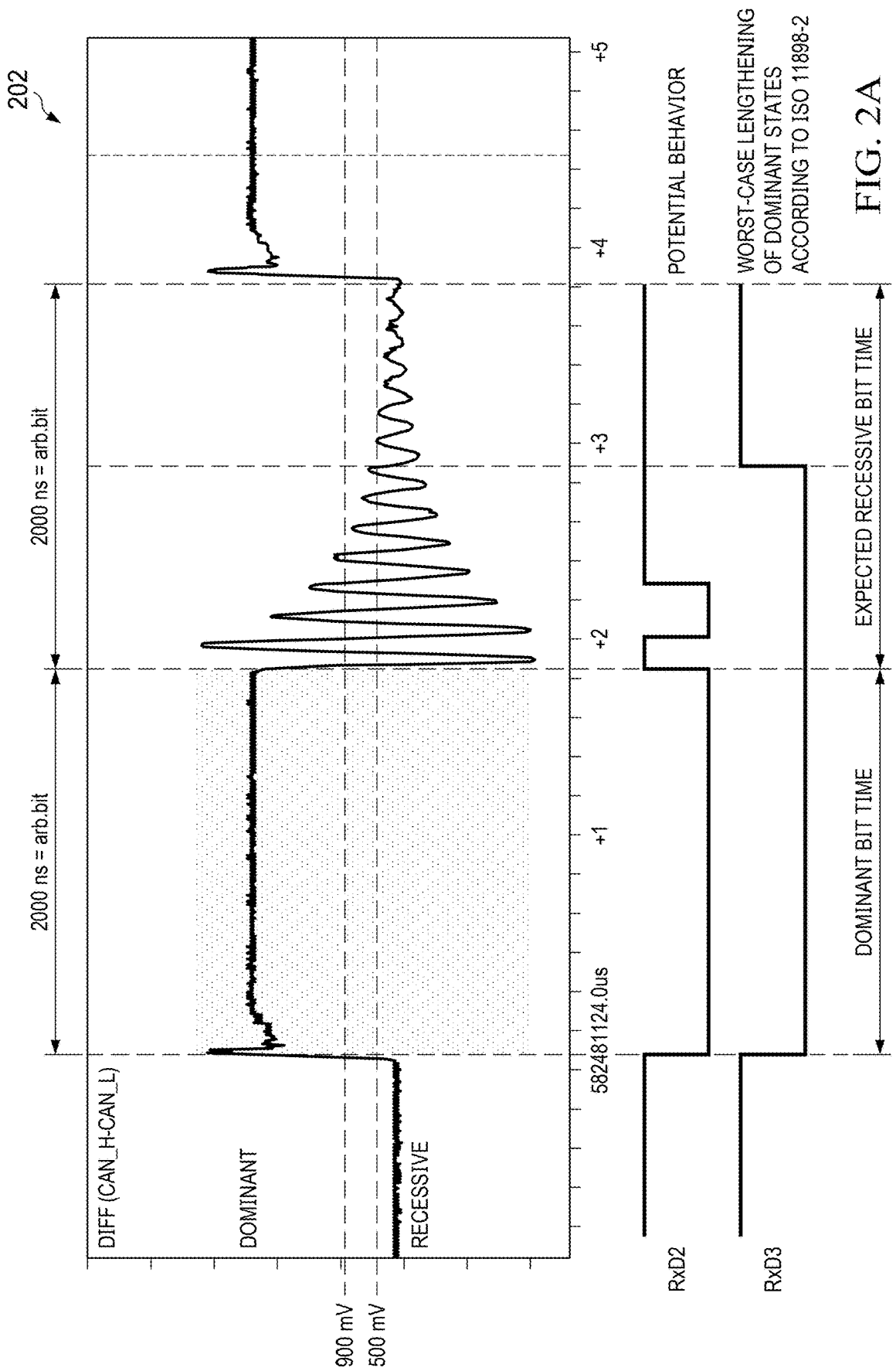
FIG. 2A is a graphical illustration depicting example ringing and data corruption that can occur during communication using a CAN protocol.
Figure 2B:
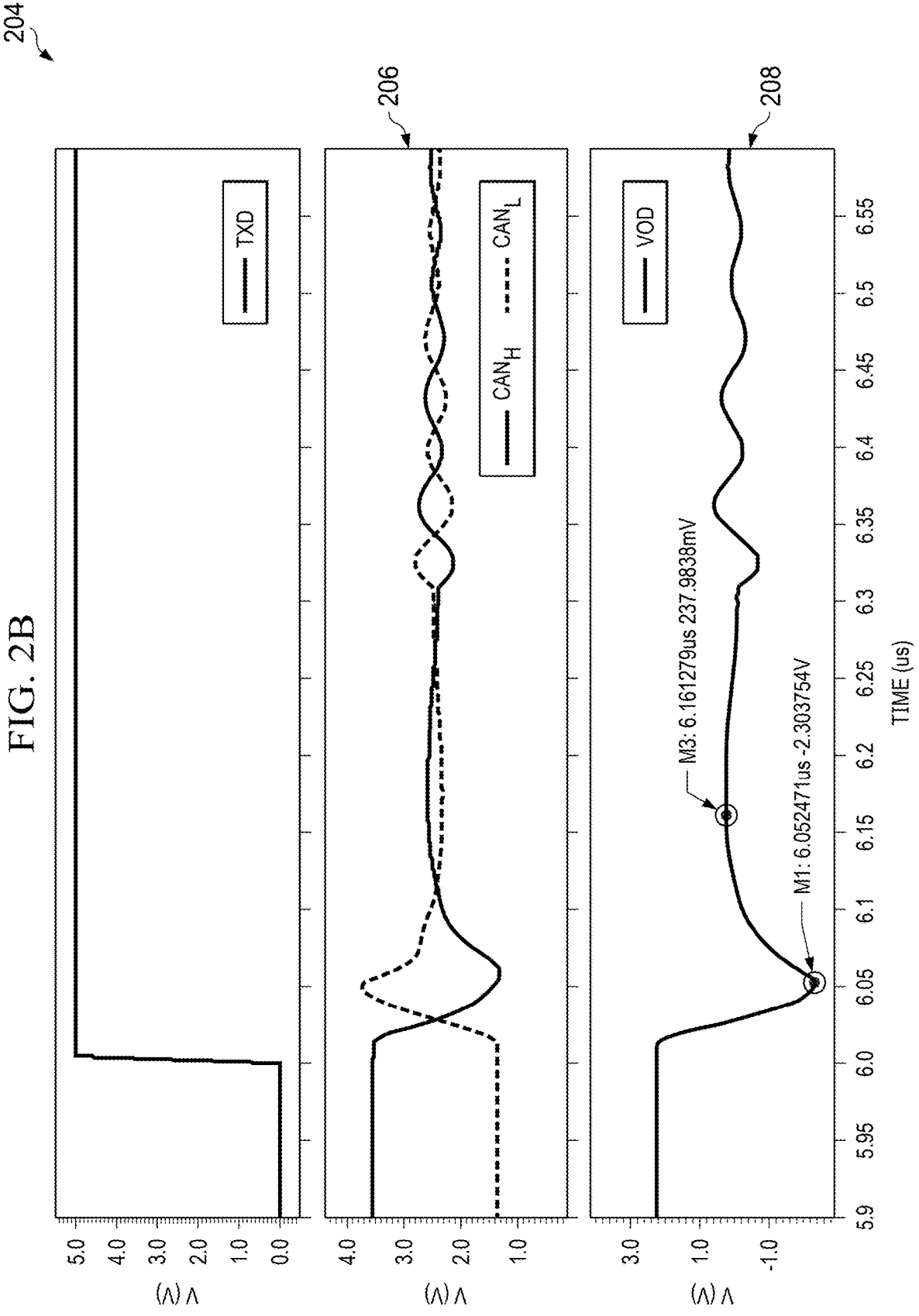
FIG. 2B is another graphical illustration depicting example ringing and data corruption that can occur during communication using a CAN protocol.

For example, FIG. 2A is a graphical illustration 202 depicting example ringing and data corruption that can occur during communication using a CAN protocol. In FIG. 2A, as a communication bus transitions from a dominant state to a recessive state, ringing (e.g., an oscillating signal) on the communication bus can cause devices reading the communication bus to inaccurately read a bit value of zero where a bit value of one was transmitted. FIG. 2B is another graphical illustration 204 depicting example ringing and data corruption that can occur during communication using a CAN protocol. For example, the ringing illustrated in FIG. 2B results from inductive or capacitive loads in a CAN discharging over time.

In FIG. 2B, a first example plot 206 depicts a view of the CAN high signal and the CAN low signal after a transition from a dominant state (e.g., a 0-bit) to a recessive state (e.g., a 1-bit). In the plot 206, the transitions from the dominant state to the recessive state cause the voltage of the CAN high signal to dip and the voltage of the CAN low signal to peak. For example, the voltages of the CAN high signal and the CAN low signal invert and exceed, in magnitude, previous values of the signals, which causes significant undershoot on the CAN high signal and overshoot on the CAN low signal.

As a result of ringing on the CAN high signal and the CAN low signal, the differential voltage between the CAN high signal and the CAN low signal of a communication bus exceeds a threshold indicative of a dominant state. This may lead to a device reading the communication bus to read an incorrect bit value (e.g., a 0-bit instead of a 1-bit). In FIG. 2B, a second example plot 208 depicts an enlarged view of the CAN high signal after a transition from a dominant state (e.g., a 0-bit) to a recessive state (e.g., a 1-bit). As illustrated in the plot 208, the CAN high signal undershoots to −2.3 V. In addition to potentially corrupting data, ringing can cause electromagnetic interference in a CAN. As such, ringing can at least one of corrupt data or degrade performance of components of a CAN.

Figure 3:
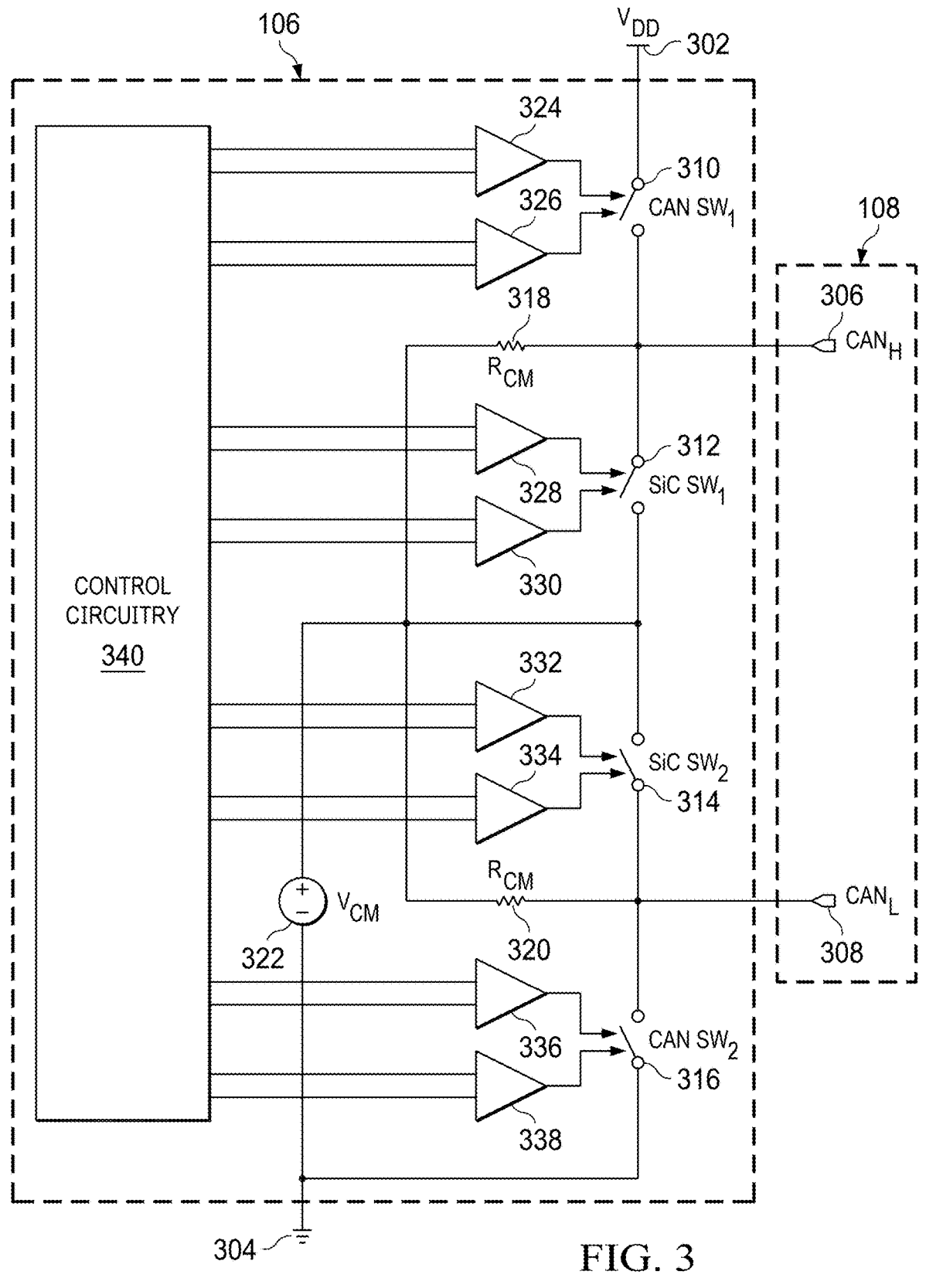
FIG. 3 is a block diagram of an example of the transceiver of FIG. 1.

Advantageously, examples described herein include a CAN transceiver having a signal improvement capability (SiC) circuit for improved ringing behavior and electromagnetic compatibility (EMC). For example, FIG. 3 is a block diagram of an example of the transceiver 106 of FIG. 1. As shown, the transceiver 106 is coupled to an example supply terminal 302, at which a supply voltage VDD is provided and an example ground terminal 304, at which a ground voltage (e.g., a common voltage) is provided. Also, the transceiver 106 is coupled to the communication bus 108 via an example CAN high terminal 306 and an example CAN low terminal 308 (e.g., of the transceiver 106).

The transceiver 106 includes a first example CAN switch 310, a first example SiC switch 312, a second example SiC switch 314, and a second example CAN switch 316. Also, the transceiver 106 includes a first example common mode resistor 318, a second example common mode resistor 320, and an example common mode voltage source 322. The first common mode resistor 318 and the second common mode resistor 320 are common mode resistors because they are both coupled to common mode terminal/node (e.g., a terminal/node that is common to both the CANH terminal 306 and the CANI, terminal 308). The transceiver 106 includes a first example CAN driver 324, a second example CAN driver 326, a first example SiC driver 328, a second example SiC driver 330, a third example SiC driver 332, a fourth example SiC driver 334, a third example CAN driver 336, and a fourth example CAN driver 338.

The transceiver 106 also includes example control circuitry 340. In FIG. 3, the control circuitry 340 may include asynchronous logic circuitry or at least one analog timer circuit. In some examples, the control circuitry 340 includes finite state machine logic circuitry. In FIG. 3, the control circuitry 340 includes a first output terminal, a second output terminal, a third output terminal, a fourth output terminal, a fifth output terminal, a sixth output terminal, a seventh output terminal, an eighth output terminal, a ninth output terminal, a tenth output terminal, an eleventh output terminal, and a twelfth output terminal to control one or more of the CAN switch 310, the SiC switch 312, the SiC switch 314, or the CAN switch 316. For example, the control circuitry 340 controls the CAN switch 310 using at least one of the CAN driver 324 or the CAN driver 326 as described further herein.

The control circuitry 340 of FIG. 3 controls the SiC switch 312 using at least one of the SiC driver 328 or the SiC driver 330 as described further herein. Also, the control circuitry 340 controls the SiC switch 314 using at least one of the SiC driver 332 or the SiC driver 334 as described further herein. In FIG. 3, the control circuitry 340 controls the CAN switch 316 using at least one of the CAN driver 336 or the CAN driver 338 as described further herein.

The common mode resistor 318 and the common mode resistor 320 of FIG. 3 may be implemented by resistors having approximately the same resistance. Also, the common mode voltage source 322 is illustrated as a source in FIG. 3. However, the common mode voltage source 322 may instead be implemented by a terminal of the transceiver 106 that is designated as a common mode voltage terminal for the transceiver 106.

During example operation, to place the communication bus 108 in a dominant state, the control circuitry 340 transmits at least one control signal to the CAN driver 324, the CAN driver 326, the CAN driver 336, and the CAN driver 338. Responsive to the at least one control signal from the control circuitry 340, the CAN driver 324 and the CAN driver 326 close the CAN switch 310 (e.g., configure the CAN switch 310 so that the CAN switch 310 conducts current). Also, responsive to the at least one control signal from the control circuitry 340, the CAN driver 336 and the CAN driver 338 close the CAN switch 316 (e.g., configure the CAN switch 316 so that the CAN switch 316 conducts current). As such, the control circuitry 340 creates a differential voltage between the CAN high terminal 306 and the CAN low terminal 308.

To place the communication bus 108 in a recessive state, the control circuitry 340 transmits at least one control signal to the CAN driver 324, the CAN driver 326, the CAN driver 336, and the CAN driver 338. Responsive to the at least one control signal from the control circuitry 340, the CAN driver 324 and the CAN driver 326 open the CAN switch 310 (e.g., configure the CAN switch 310 so that the CAN switch 310 does not conduct current). Also, responsive to the at least one control signal from the control circuitry 340, the CAN driver 336 and the CAN driver 338 open the CAN switch 316 (e.g., configure the CAN switch 316 so that the CAN switch 316 does not conduct current). As such, the control circuitry 340 collapses the differential voltage between the CAN high terminal 306 and the CAN low terminal 308.

Advantageously, after transitioning the communication bus 108 from a dominant state to a recessive state, the control circuitry 340 controls the SiC switch 312 and the SiC switch 314, as described further herein, to conduct current. As such, the SiC switch 312 and the SiC switch 314 dissipate transient signals (e.g., ringing) on the communication bus 108 and improve data integrity on the communication bus 108. Also, by dissipating transient signals on the communication bus 108, the SiC switch 312 and the SiC switch 314 reduce electromagnetic interference (EMI) in the CAN 102 of FIG. 1.

Figure 4:
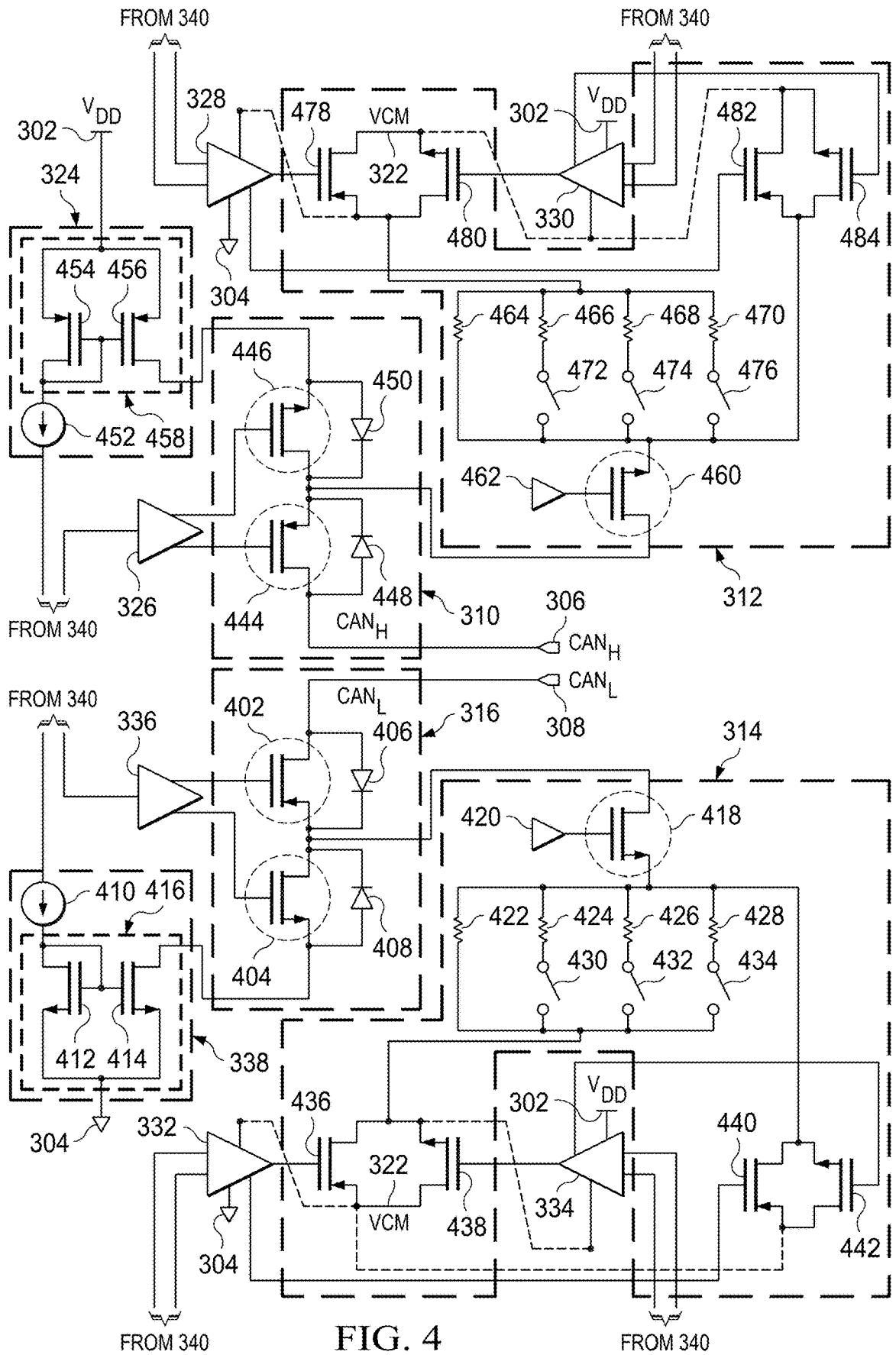
FIG. 4 is a block diagram of an example of the first CAN switch, the first signal improvement capability (SiC) switch, the second SiC switch, the second CAN switch, the first CAN driver, and the fourth CAN driver of FIG. 3.

FIG. 4 is a block diagram of an example of the CAN switch 310, the SiC switch 312, the SiC switch 314, the CAN switch 316, the CAN driver 324, and the CAN driver 338 of FIG. 3. In FIG. 4, the CAN switch 316 includes a first example transistor 402, a second example transistor 404, a first example diode 406, and a second example diode 408. Also, in FIG. 4, the CAN driver 338 includes a first example current source 410, a third example transistor 412, and a fourth example transistor 414. For example, the transistor 412 and the transistor 414 are coupled together to form a first example current mirror 416 as described further herein.

The SiC switch 314 of FIG. 4 includes a fifth example transistor 418 and a first example driver 420. In FIG. 4, the SiC switch 314 also includes a first example resistor 422, a second example resistor 424, a third example resistor 426, a fourth example resistor 428, a first example switch 430, a second example switch 432, and a third example switch 434. Also, the SiC switch 314 includes a sixth example transistor 436, a seventh example transistor 438, an eighth example transistor 440, and a ninth example transistor 442.

The CAN switch 310 of FIG. 4 includes a tenth example transistor 444, an eleventh example transistor 446, a third example diode 448, and a fourth example diode 450. Also, in FIG. 4, the CAN driver 324 includes a second example current source 452, a twelfth example transistor 454, and a thirteenth example transistor 456. For example, the transistor 454 and the transistor 456 are coupled together to form a second example current mirror 458.

The SiC switch 312 of FIG. 4 includes a fourteenth example transistor 460 and a second example driver 462. In FIG. 4, the SiC switch 312 also includes a fifth example resistor 464, a sixth example resistor 466, a seventh example resistor 468, an eighth example resistor 470, a fourth example switch 472, a fifth example switch 474, and a sixth example switch 476. Also, the SiC switch 312 includes a fifteenth example transistor 478, a sixteenth example transistor 480, a seventeenth example transistor 482, and an eighteenth example transistor 484.

The CAN switch 310, the CAN driver 324, and the SiC switch 312 of FIG. 4 include similar components to the components of the CAN switch 316, the CAN driver 338, the SiC switch 314. Also, as illustrated in FIG. 4, the components of the CAN switch 310, the CAN driver 324, and the SiC switch 312 are connected in a similar manner as the components of the CAN switch 316, the CAN driver 338, the SiC switch 314 but with respect to the supply terminal 302, the CAN high terminal 306, the CAN driver 326, the SiC driver 328, and the SiC driver 330 instead of the ground terminal 304, the CAN low terminal 308, the CAN driver 336, the SiC driver 332, and the SiC driver 334. For purposes of clarity, the structure and operation of the CAN switch 310, the CAN driver 324, and the SiC switch 312 are not described further herein. Instead, the structure and operation of the CAN switch 316, the CAN driver 338, and the SiC switch 314 similarly apply to the CAN switch 310, the CAN driver 324, and the SiC switch 312 but with respect to the supply terminal 302, the CAN high terminal 306, the CAN driver 326, the SiC driver 328, and the SiC driver 330 instead of the ground terminal 304, the CAN low terminal 308, the CAN driver 336, the SiC driver 332, and the SiC driver 334.

Figure 5:
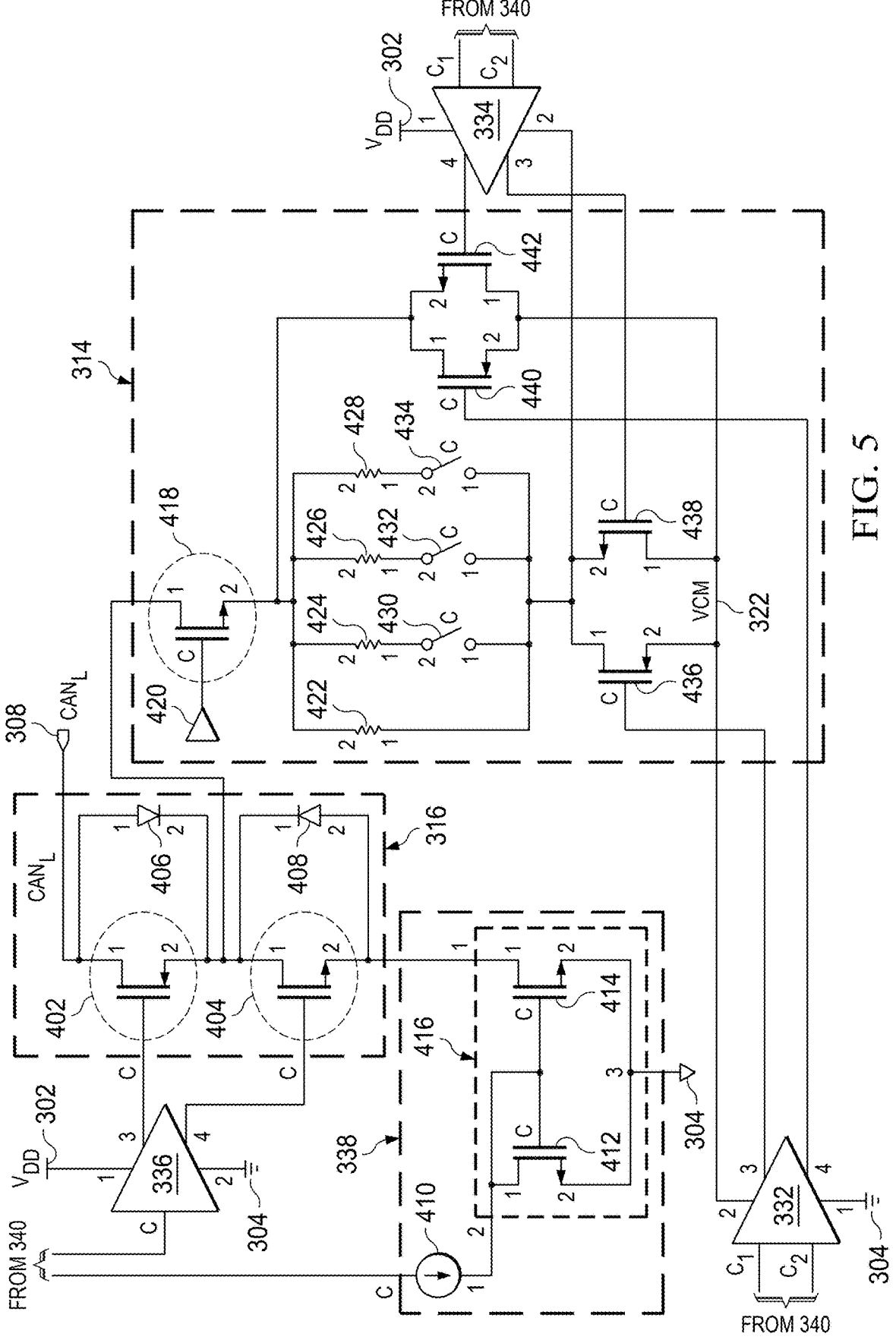
FIG. 5 is a block diagram of the second SiC switch, the second CAN switch, and the fourth CAN driver of FIG. 4.

FIG. 5 is a block diagram of the SiC switch 314, the CAN switch 316, and the CAN driver 338 of FIG. 4. As illustrated in FIG. 5, each of the SiC driver 332 and the SiC driver 334 has a first control terminal, a second control terminal, a first terminal, a second terminal, a third terminal, and a fourth terminal. In FIG. 5, the CAN driver 336 has a control terminal, a first terminal, a second terminal, a third terminal, and a fourth terminal.

Each of the transistor 402, the transistor 404, the transistor 412, the transistor 414, the transistor 418, the transistor 436, the transistor 438, the transistor 440, and the transistor 442 of FIG. 5 has a control terminal (e.g., a gate terminal), a first terminal (e.g., a drain terminal), and a second terminal (e.g., a source terminal). In FIG. 5, each of the diode 406, the diode 408, the resistor 422, the resistor 424, the resistor 426, and the resistor 428 has a first terminal and a second terminal. Also, in FIG. 5, each of the switch 430, the switch 432, and the switch 434 has a control terminal, a first terminal, and a second terminal.

The current source 410 of FIG. 5 has a control terminal and a first terminal. In FIG. 5, the current mirror 416 has a first terminal, a second terminal, and a third terminal. Also, the driver 420 has an output terminal.

The SiC driver 332 of FIG. 5 is implemented as illustrated and described in connection with FIG. 7A below. In FIG. 5, the first control terminal of the SiC driver 332 is coupled to a first output terminal of the control circuitry 340 and the second control terminal of the SiC driver 332 is coupled to a second output terminal of the control circuitry 340. Also, the first terminal of the SiC driver 332 is coupled to the ground terminal 304. In some examples, the ground terminal 304 is referred to as a voltage terminal. In FIG. 5, the second terminal of the SiC driver 332 is coupled to the common mode voltage source 322, the second terminal of the transistor 436, the first terminal of the transistor 438, the second terminal of the transistor 440, and the first terminal of the transistor 442. Also, the third terminal of the SiC driver 332 is coupled to the control terminal of the transistor 436 and the fourth terminal of the SiC driver 332 is coupled to the control terminal of the transistor 440.

The SiC driver 334 of FIG. 5 is implemented as illustrated and described in connection with FIG. 7B below. In FIG. 5, the first control terminal of SiC driver 334 is coupled to a third output terminal of the control circuitry 340 and the second control terminal of the SiC driver 334 is coupled to a fourth output terminal of the control circuitry 340. Also, the first terminal of the SiC driver 334 is coupled to the supply terminal 302. In some examples, the supply terminal 302 is referred to as a voltage terminal. In FIG. 5, the second terminal of the SiC driver 334 is coupled to the first terminal of the resistor 422, the first terminal of the switch 430, the first terminal of the switch 432, the first terminal of the switch 434, the first terminal of the transistor 436, and the second terminal of the transistor 438. Also, the third terminal of the SiC driver 334 is coupled to the control terminal of the transistor 438 and the fourth terminal of the SiC driver 334 is coupled to the control terminal of the transistor 442.

The CAN driver 336 of FIG. 5 may be implemented and controlled by any suitable analog circuitry or digital circuitry. Also, the control terminal of the CAN driver 336 is coupled to a fifth output terminal of the control circuitry 340. In FIG. 5, the first terminal of the CAN driver 336 is coupled to the supply terminal 302 and the second terminal of the CAN driver 336 is coupled to the ground terminal 304. Also, the third terminal of the CAN driver 336 is coupled to the control terminal of the transistor 402 and the fourth terminal of the CAN driver 336 is coupled to the control terminal of the transistor 404. In FIG. 5, the CAN driver 336 drives the control terminals of the transistor 402 and the transistor 404 to enable the transistor 402 and the transistor 404 to conduct current.

As used herein, when a transistor or switch is enabled, the transistor operates as a closed switch to conduct current between the two current terminals (e.g., the source and drain terminals) of the transistor. When a transistor or switch is disabled, the transistor operates as an open switch to block current from flowing between the two current terminals of the transistor. A transistor or switch can be enabled or disabled based on the voltage or current applied to the control terminal (e.g., the gate terminal) of the transistor.

The transistor 402 of FIG. 5 includes a drain-extended P-channel metal-oxide semiconductor (DEPMOS) field-effect transistor (FET) that is rated for high voltage (e.g., +58 volts (V)). In FIG. 5, the control terminal of the transistor 402 is coupled to the third terminal of the CAN driver 336. Also, the first terminal of the transistor 402 is coupled to the CAN low terminal 308 and the first terminal of the diode 406. In FIG. 5, the second terminal of the transistor 402 is coupled to the second terminal of the diode 406, the first terminal of the transistor 404, the first terminal of the diode 408, and the first terminal of the transistor 418.

The transistor 404 of FIG. 5 includes an N-channel laterally diffused metal-oxide semiconductor (LDMOS) FET (e.g., an N-channel transistor) that is rated for high voltage. In FIG. 5, the control terminal of the transistor 404 is coupled to the fourth terminal of the CAN driver 336. Also, the first terminal of the transistor 404 is coupled to the first terminal of the diode 408, the second terminal of the transistor 402, the second terminal of the diode 406, and the first terminal of the transistor 418. In FIG. 5, the second terminal of the transistor 404 is coupled to the second terminal of the diode 408 and the first terminal of the transistor 414, or more generally, the first terminal of the current mirror 416.

The first terminal of the diode 406 of FIG. 5 is coupled to the first terminal of the transistor 402 and the CAN low terminal 308. In FIG. 5, the second terminal of the diode 406 is coupled to the second terminal of the transistor 402, the first terminal of the transistor 404, the first terminal of the diode 408, and the first terminal of the transistor 418. Also, the first terminal of the diode 408 is coupled to the first terminal of the transistor 404, the second terminal of the transistor 402, the second terminal of the diode 406, and the first terminal of the transistor 418. In FIG. 5, the second terminal of the diode 408 is coupled to the second terminal of the transistor 404 and the first terminal of the transistor 414, or, more generally, the first terminal of the current mirror 416.

The current source 410 of FIG. 5 may be implemented and controlled by any suitable analog circuitry or digital circuitry. In FIG. 5, the control terminal of the current source 410 is coupled to a sixth output terminal of the control circuitry 340. Also, the first terminal of the current source 410 is coupled to the control terminal of the transistor 412, the first terminal of the transistor 412, and the control terminal of the transistor 414, or, more generally, the second terminal of the current mirror 416.

The transistor 412 of FIG. 5 includes an N-channel metal-oxide semiconductor (NMOS) FET that is rated for low voltage (e.g., +5 V). In some examples, the transistor 412 includes a body biasing circuit (not shown) to reduce variation of the transistor 412 across temperature. In FIG. 5, the control terminal of the transistor 412 is coupled to the first terminal of the current source 410, the first terminal of the transistor 412, and the control terminal of the transistor 414. Also, the second terminal of the transistor 412 is coupled to the ground terminal 304 and the second terminal of the transistor 414.

The transistor 414 of FIG. 5 includes an NMOS FET that is rated for low voltage. In some examples, the transistor 414 includes a body biasing circuit (not shown) to reduce variation of the transistor 414 across temperature. In FIG. 5, the control terminal of the transistor 414 is coupled to the first terminal of the current source 410, the control terminal of the transistor 412, and the first terminal of the transistor 412. Also, the first terminal of the transistor 414, or, more generally, the first terminal of the current mirror 416, is coupled to the second terminal of the transistor 404 and the second terminal of the diode 408. In FIG. 5, the second terminal of the transistor 414 is coupled to the ground terminal 304 and the second terminal of the transistor 412. In FIG. 5, the second terminal of the transistor 412 and the second terminal of the transistor 414 operate as the third terminal of the current mirror 416.

The transistor 418 of FIG. 5 includes an N-channel LDMOS FET that is rated for high voltage. In FIG. 5, the control terminal of the transistor 418 is coupled to the output terminal of the driver 420. Also, the first terminal of the transistor 418 is coupled to the second terminal of the transistor 402, the second terminal of the diode 406, the first terminal of the transistor 404, and the first terminal of the diode 408. In FIG. 5, the second terminal of the transistor 418 is coupled to the second terminal of the resistor 422, the second terminal of the resistor 424, the second terminal of the resistor 426, the second terminal of the resistor 428, the first terminal of the transistor 440, and the second terminal of the transistor 442.

The driver 420 of FIG. 5 may be implemented and controlled by any suitable analog circuitry or digital circuitry. In FIG. 5, the output terminal of the driver 420 is coupled to the control terminal of the transistor 418. Also, the first driver 420 drives the control terminal of the transistor 418 to enable the transistor 418 to conduct current.

One or more of the resistor 422, the resistor 424, the resistor 426, or the resistor 428 of FIG. 5 includes a polysilicon resistor. In FIG. 5, the first terminal of the resistor 422 is coupled to the second terminal of the SiC driver 334, the first terminal of the switch 430, the first terminal of the switch 432, the first terminal of the switch 434, the first terminal of the transistor 436, and the second terminal of the transistor 438. Also, the second terminal of each of the resistor 422, the resistor 424, the resistor 426, and the resistor 428 is coupled to the second terminal of the transistor 418, the first terminal of the transistor 440, and the second terminal of the transistor 442. Also, each of the first terminal of the resistor 424, the first terminal of the resistor 426, and the first terminal of the resistor 428 is coupled to the second terminal of the switch 430, the second terminal of the switch 432, and the second terminal of the switch 434, respectively.

Each of the switch 430, the switch 432, and the switch 434 of FIG. 5 may be implemented and controlled by any suitable analog circuitry or digital circuitry. In FIG. 5, the control terminal of the switch 430, the control terminal of the switch 432, and the control terminal of the switch 434 are coupled to at least one other circuit. Also, the first terminal of the switch 430, the first terminal of the switch 432, and the first terminal of the switch 434 is coupled to the second terminal of the SiC driver 334, the first terminal of the resistor 422, the first terminal of the transistor 436, and the second terminal of the transistor 438.

each of the second terminal of the switch 430, the second terminal of the switch 432, and the second terminal of the switch 434 of FIG. 5 is coupled to the first terminal of the resistor 424, the first terminal of the resistor 426, and the first terminal of the resistor 428, respectively. In FIG. 5, the transistor 436 includes a P-channel metal-oxide semiconductor (PMOS) FET (e.g., a P-channel transistor) that is rated for low voltage. In some examples, the transistor 436 includes a body biasing circuit to reduce variation of the transistor 436 across temperature. In FIG. 5, the control terminal of the transistor 436 is coupled to the third terminal of the SiC driver 332.

The first terminal of the transistor 436 of FIG. 5 is coupled to the second terminal of the SiC driver 334, the first terminal of the resistor 422, the first terminal of the switch 430, the first terminal of the switch 432, the first terminal of the switch 434, and the second terminal of the transistor 438. In FIG. 5, the second terminal of the transistor 436 is coupled to the second terminal of the SiC driver 332, the first terminal of the transistor 438, the second terminal of the transistor 440, and the first terminal of the transistor 442. Also, the second terminal of the transistor 436 is coupled to the common mode voltage source 322.

The transistor 438 of FIG. 5 includes an NMOS FET that is rated for low voltage. In some examples, the transistor 438 includes a body biasing circuit to reduce variation of the transistor 438 across temperature. In FIG. 5, the control terminal of the transistor 438 is coupled to the third terminal of the SiC driver 334. Also, the first terminal of the transistor 438 is coupled to the second terminal of the SiC driver 332, the second terminal of the transistor 436, the second terminal of the transistor 440, and the first terminal of the transistor 442.

The first terminal of the transistor 438 of FIG. 5 is also coupled to the common mode voltage source 322. In FIG. 5, the second terminal of the transistor 438 is coupled to the second terminal of the SiC driver 334, the first terminal of the resistor 422, the first terminal of the switch 430, the first terminal of the switch 432, the first terminal of the switch 434, and the first terminal of the transistor 436. Also, the transistor 440 includes a PMOS FET that is rated for low voltage. In some examples, the transistor 440 includes a body biasing circuit to reduce variation of the transistor 440 across temperature.

The control terminal of the transistor 440 of FIG. 5 is coupled to the fourth terminal of the SiC driver 332. In FIG. 5, the first terminal of the transistor 440 is coupled to the second terminal of the transistor 418, the second terminal of the resistor 422, the second terminal of the resistor 424, the second terminal of the resistor 426, the second terminal of the resistor 428, and the second terminal of the transistor 442. Also, the second terminal of the transistor 440 is coupled to the second terminal of the SiC driver 332, the second terminal of the transistor 436, the first terminal of the transistor 438, and the first terminal of the transistor 442.

The second terminal of the transistor 440 of FIG. 5 is also coupled to the common mode voltage source 322. In FIG. 5, the transistor 442 includes an NMOS FET that is rated for low voltage. In some examples, the transistor 442 includes a body biasing circuit to reduce variation of the transistor 442 across temperature. In FIG. 5, the control terminal of the transistor 442 is coupled to the fourth terminal of the SiC driver 334.

The first terminal of the transistor 442 of FIG. 5 is coupled to the second terminal of the SiC driver 332, the second terminal of the transistor 436, the first terminal of the transistor 438, and the second terminal of the transistor 440. In FIG. 5, the first terminal of the transistor 442 is also coupled to the common mode voltage source 322. Also, the second terminal of the transistor 442 is coupled to the second terminal of the transistor 418, the second terminal of the resistor 422, the second terminal of the resistor 424, the second terminal of the resistor 426, the second terminal of the resistor 428, and the first terminal of the transistor 440.

Each of the transistor 404, the transistor 412, the transistor 414, the transistor 418, the transistor 438, and the transistor 442 of FIG. 5 is an N-channel MOSFET as described above. Alternatively, one or more of the transistor 404, the transistor 412, the transistor 414, the transistor 418, the transistor 438, or the transistor 442 may be an N-channel field-effect transistor (FET), an N-channel insulated-gate bipolar transistor (IGBT), an N-channel junction field effect transistor (JFET), an NPN bipolar junction transistor (BJT) or, with slight modifications, a P-channel equivalent device. In FIG. 5, each of the transistor 402, the transistor 436, and the transistor 440 is a P-channel MOSFET as described above. Alternatively, one or more of the transistor 402, the transistor 436, or the transistor 440 may be a P-channel FET, a P-channel IGBT, a P-channel JFET, a PNP BJT, or, with slight modifications, an N-channel equivalent device. One or more of the transistor 402, the transistor 404, the transistor 412, the transistor 414, the transistor 418, the transistor 436, the transistor 438, the transistor 440, or the transistor 442 may be a depletion mode device, a drain-extended device, an enhancement mode device, a natural transistor or other type of device structure transistor. Furthermore, one or more of the transistor 402, the transistor 404, the transistor 412, the transistor 414, the transistor 418, the transistor 436, the transistor 438, the transistor 440, or the transistor 442 may be implemented in/over a silicon (Si) substrate, a silicon carbide (SIC) substrate, a gallium nitride (GaN) substrate or a gallium arsenide (GaAs) substrate.

Figure 6:
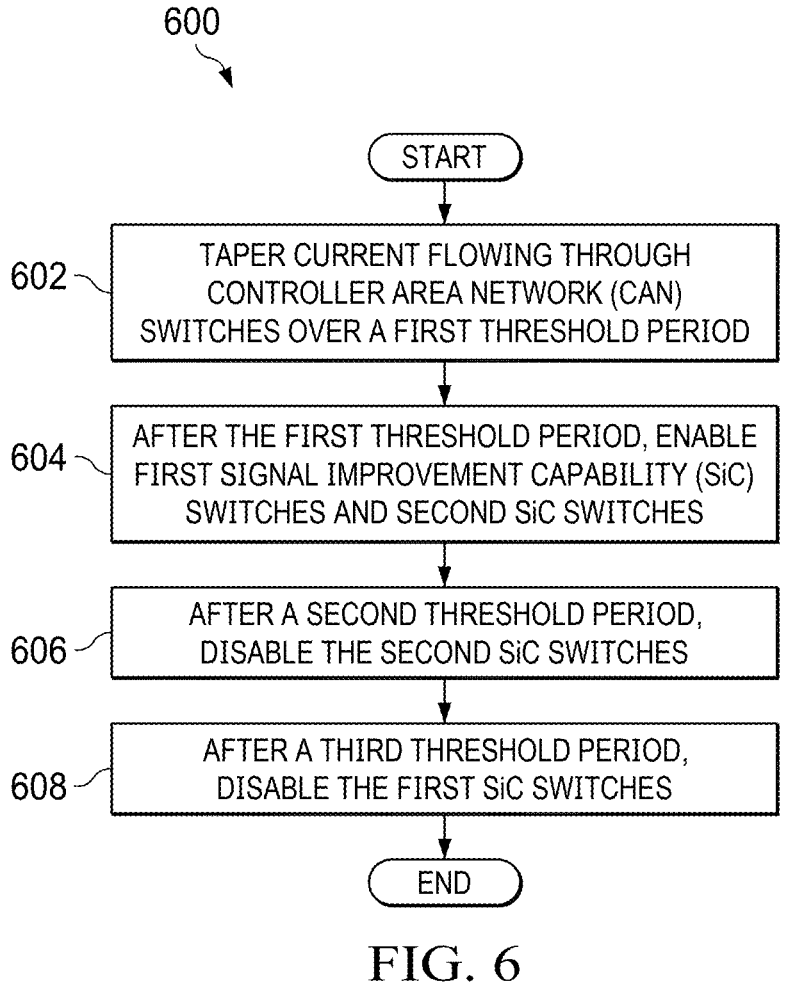
FIG. 6 is a flowchart representative of at least one of example machine-readable instructions or example operations that may be at least one of executed, instantiated, or performed using example programmable circuitry of the control circuitry of FIG. 3 to control the second SiC switch and the second CAN switch.

FIG. 6 is a flowchart representative of at least one example machine-readable instructions or example operations 600 that may be at least one of executed, instantiated, or performed using example programmable circuitry of the control circuitry 340 of FIG. 3 to control the SiC switch 314 and the CAN switch 316. As described above, the CAN switch 310 and the SiC switch 312 are implemented similarly to the CAN switch 316 and the SiC switch 314. As such, operation described with respect to at least one of the CAN switch 316 or the SiC switch 314 is likewise applicable to at least one of the CAN switch 310 or the SiC switch 312, respectively.

At block 602, the control circuitry 340 tapers current flowing through CAN switches over a first threshold period. For example, the control circuitry 340 transmits at least one control signal to the current source 410. Responsive to the at least one control signal from the control circuitry 340, the current source 410 tapers current flowing through the transistor 402 and the transistor 404 over the first threshold period. In some examples, the current source 410 includes two or more current mirrors (not shown). As such, to taper the current flowing through the transistor 402 and the transistor 404, the control circuitry 340 can output a signal to the current source 410 to disable the two or more current mirrors of the current source 410 over the first threshold period. For example, the control circuitry 340 disables a first current mirror (not shown) of the current source 410 at a first time and then disables a second current mirror (not shown) of the current source 410 at a second time. When the two or more current mirrors of the current source 410 are disabled, the amount of current generated by the current source 410 decreases to zero current. The control circuitry 340 continues this process until the current produced by the current source 410 is zero, or within a threshold of zero.

The control circuitry 340 performs similar operations with respect to the transistor 444, the transistor 446, and the current source 452. As such, the voltage at the CAN high terminal 306 decreases and the voltage at the CAN low terminal 308 increases (e.g., collapsing the differential voltage and transitioning the communication bus 108 from the dominant state to the recessive state). In FIG. 6, the first threshold period is 20 nanosecond (ns)+5 ns. For example, length of the first threshold period is a programmable value programmed into the control circuitry 340.

At block 604, after the first threshold period, the control circuitry 340 enables first SiC switches and second SiC switches. For example, after the first threshold period, the control circuitry 340 transmits at least one control signal to the SiC driver 332 and the SiC driver 334. Responsive to the at least one control signal from the control circuitry 340, the SiC driver 332 enables the transistor 436 and the transistor 440 and the SiC driver 334 enables the transistor 438 and the transistor 442. Because the transistor 438 and the transistor 442 have a relatively low resistance (e.g., 10 Ohms), the voltage on the communication bus 108 does not change greatly. In FIG. 6, the control circuitry 340 performs similar operations with respect to the SiC driver 328, the transistor 478, and the transistor 482 as well as with respect to the SiC driver 330, the transistor 480, and the transistor 484.

At block 606, after a second threshold period, the control circuitry 340 disables the second SiC switches. For example, after the second threshold period, the control circuitry 340 transmits at least one control signal to the SiC driver 332 and the SiC driver 334. Responsive to the at least one control signal from the control circuitry 340, the SiC driver 332 disables the transistor 440 and the SiC driver 334 disables the transistor 442. In FIG. 6, the second threshold period is about 100 ns. Also, in FIG. 6, the second threshold period is determined based on the amount of current to be dissipated through the transistor 440 and the transistor 442, the sizes of each of the transistor 440 and the transistor 442, the level of saturation of each of the transistor 440 and the transistor 442, as well as related parameters (e.g., resistance) defined by the CAN standard.

For example, respective sizes of the transistor 440 and the transistor 442 as well as respective levels of saturation of the transistor 440 and the transistor 442 impact the resistance of the transistor 440 and the transistor 442 while enabled. Also, for example, if the transistor 440 and the transistor 442 are enabled for a longer period, then the transistor 440 and the transistor 442 conduct more of the current produced by transient signals resulting from the state transition on the communication bus 108. Consequently, if the transistor 440 and the transistor 442 are enabled for a longer period, then the less likely that the differential voltage on the communication bus 108 inverts (e.g., undershoots). Also, the length of the second threshold period is also dependent on related parameters defined by the CAN standard as described above.

The control circuitry 340 performs similar operations with respect to the SiC driver 328 and the transistor 482 as well as the SiC driver 330 and the transistor 484. As such, the control circuitry 340 enables the SiC switch 312 and the SiC switch 314 to conduct transient signals (e.g., resulting from the transition from the dominant state to the recessive state) for the second period. Advantageously, at least because of (1) the current path through the transistor 440 and the transistor 442 and (2) the current path through the transistor 482 and the transistor 484, the SiC switch 312 and the SiC switch 314 allow for at least one of inductive or capacitive loads on the communication bus 108 to discharge without the bus voltage varying outside permitted limits defined by the CAN standard.

At block 608, after a third threshold period, the control circuitry 340 disables the first SiC switches. For example, after the third threshold period, the control circuitry 340 transmits at least one control signal to the SiC driver 332 and the SiC driver 334. Responsive to the at least one control signal from the control circuitry 340, the SiC driver 332 disables the transistor 436 and the SiC driver 334 disables the transistor 438. By keeping the transistor 436 and the transistor 438 enabled for the third threshold period, the control circuitry 340 ensures that ringing on the CAN low terminal 308 can settle over the third threshold period. In FIG. 6, the control circuitry 340 performs similar operations with respect to the SiC driver 328 and the transistor 478 as well as the SiC driver 330 and the transistor 480.

Figure 7A:
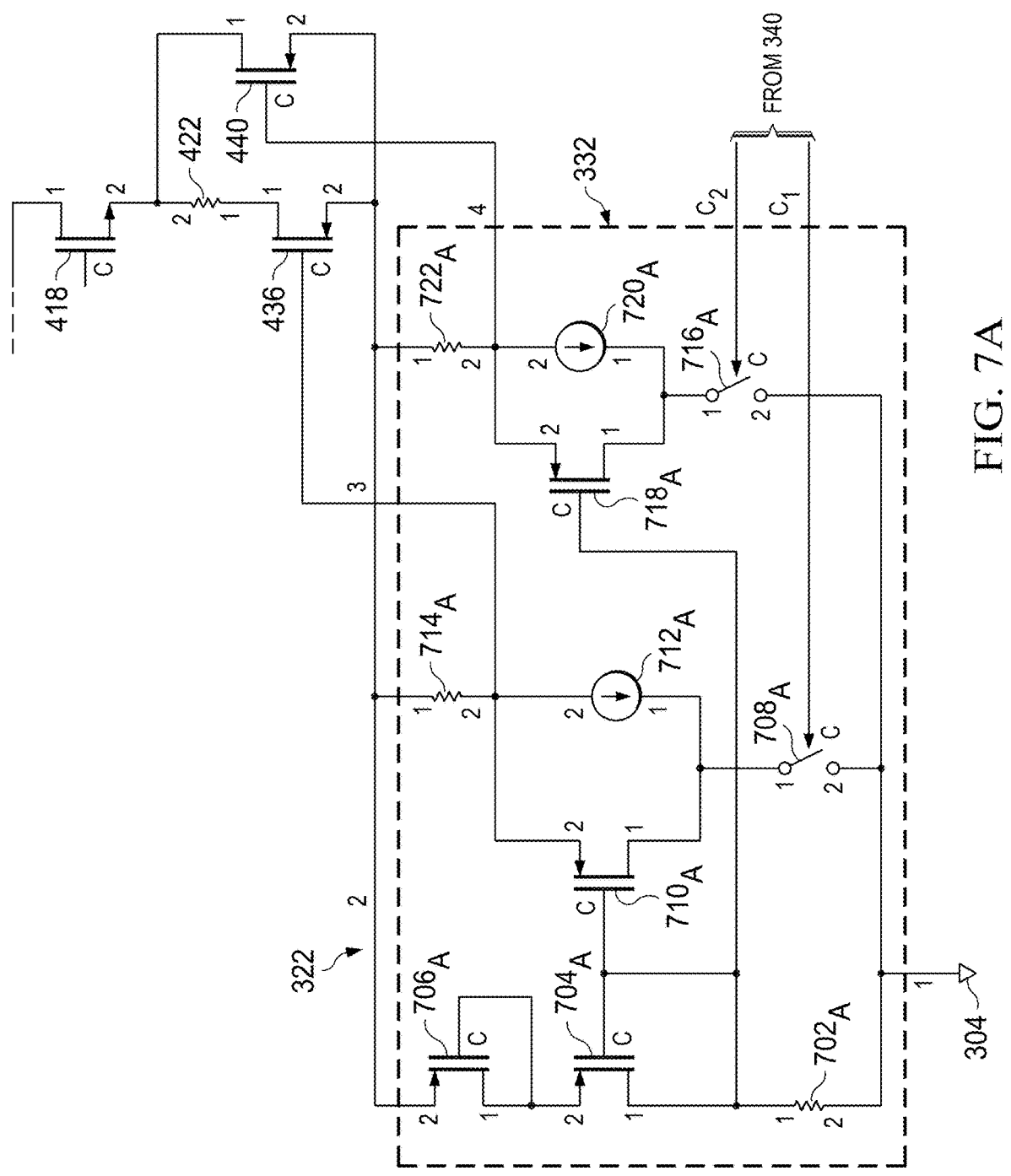
FIG. 7A is a block diagram of an example of the third SiC driver of FIGS. 3, 4, and 5.

FIG. 7A is a block diagram of an example of the SiC driver 332 of FIGS. 3, 4, and 5. In FIG. 7A, the SiC driver 332 includes a first example resistor $702_A$, a first example transistor $704_A$, a second example transistor $706_A$, a first example switch $708_A$, a third example transistor $710_A$, a first example current source $712_A$, and a second example resistor $714_A$. Also, the SiC driver 332 of FIG. 7A includes a second example switch $716_A$, a fourth example transistor $718_A$, a second example current source $720_A$, and a third example resistor $722_A$.

Each of the resistor $702_A$, the current source $712_A$, the resistor $714_A$, the current source $720_A$, and the resistor $722_A$ of FIG. 7A has a first terminal and a second terminal. In FIG. 7A, each of the transistor $704_A$, the transistor $706_A$, the transistor $710_A$, and the transistor $718_A$ has a control terminal (e.g., a gate terminal) a first terminal (e.g., a drain terminal), and a second terminal (e.g., a source terminal). Also, each of the switch $708_A$ and the switch $716_A$ has a control terminal, a first terminal, and a second terminal.

The resistor $702_A$ of FIG. 7A includes a polysilicon resistor. In FIG. 7A, the first terminal of the resistor $702_A$ is coupled to the control terminal of the transistor $704_A$, the first terminal of the transistor $704_A$, the control terminal of the transistor $710_A$, and the control terminal of the transistor $718_A$. Also, the second terminal of the resistor $702_A$ is coupled to the ground terminal 304, the second terminal of the switch $708_A$, and the second terminal of the switch $716_A$. In FIG. 7A, the transistor $704_A$ includes a PMOS FET rated for low voltage.

The control terminal of the transistor $704_A$ of FIG. 7A is coupled to the first terminal of the resistor $702_A$, the first terminal of the transistor $704_A$, the control terminal of the transistor $710_A$, and the control terminal of the transistor $718_A$. In FIG. 7A, the first terminal of the transistor $704_A$ is coupled to the first terminal of the resistor $702_A$, the control terminal of the transistor $704_A$, the control terminal of the transistor $710_A$, and the control terminal of the transistor $718_A$. Also, the second terminal of the transistor $704_A$ is coupled to the control terminal of the transistor $706_A$ and the first terminal of the transistor $706_A$.

The transistor $706_A$ of FIG. 7A includes a PMOS FET rated for low voltage. In FIG. 7A, the control terminal of the transistor $706_A$ is coupled to the second terminal of the transistor $704_A$ and the first terminal of the transistor $706_A$. Also, the first terminal of the transistor $706_A$ is coupled to the second terminal of the transistor $704_A$ and the control terminal of the transistor $706_A$. In FIG. 7A, the second terminal of the transistor $706_A$ is coupled to the second terminal of the transistor 436, the second terminal of the transistor 440, the first terminal of the resistor $714_A$, and the first terminal of the resistor $722_A$.

The switch $708_A$ of FIG. 7A may be implemented and controlled by any suitable analog circuitry or digital circuitry. In FIG. 7A, the control terminal of the switch $708_A$ operates as the first control terminal of the SiC driver 332 and as such is coupled to the first output terminal of the control circuitry 340. Also, the first terminal of the switch $708_A$ is coupled to the first terminal of the transistor $710_A$ and the first terminal of the current source $712_A$. In FIG. 7A, the second terminal of the switch $708_A$ is coupled to the ground terminal 304, the second terminal of the resistor $702_A$, and the second terminal of the switch $716_A$.

The transistor $710_A$ of FIG. 7A includes a PMOS FET rated for low voltage. In FIG. 7A, the control terminal of the transistor $710_A$ is coupled to the first terminal of the resistor $702_A$, the control terminal of the transistor $704_A$, the first terminal of the transistor $704_A$, and the control terminal of the transistor $718_A$. Also, the first terminal of the transistor $710_A$ is coupled to the first terminal of the switch $708_A$ and the first terminal of the current source $712_A$. In FIG. 7A, the second terminal of the transistor $710_A$ is coupled to the control terminal of the transistor 436, the second terminal of the current source $712_A$, and the second terminal of the resistor $714_A$. As such, the second terminal of the transistor $710_A$ operates as the third terminal of the SiC driver 332.

The current source $712_A$ of FIG. 7A may be implemented and controlled by any suitable analog circuitry or digital circuitry. In FIG. 7A, the first terminal of the current source $712_A$ is coupled to the first terminal of the switch $708_A$ and the first terminal of the transistor $710_A$. Also, the second terminal of the current source $712_A$ is coupled to the control terminal of the transistor 436, the second terminal of the transistor $710_A$, and the second terminal of the resistor $714_A$.

The resistor $714_A$ of FIG. 7A includes a polysilicon resistor. In FIG. 7A, the first terminal of the resistor $714_A$ is coupled to the second terminal of the transistor 436, the second terminal of the transistor 440, the second terminal of the transistor $706_A$, and the first terminal of the resistor $722_A$. In FIG. 7A, the second terminal of the resistor $714_A$ is coupled to the control terminal of the transistor 436, the second terminal of the transistor 710$_A$, and the second terminal of the current source 712$_A$.

The switch 716$_A$ of FIG. 7A may be implemented and controlled by any suitable analog circuitry or digital circuitry. In FIG. 7A, the control terminal of the switch 716$_A$ operates as the second control terminal of the SiC driver 332 and as such is coupled to the second output terminal of the control circuitry 340. Also, the first terminal of the switch 716$_A$ is coupled to the first terminal of the transistor 718$_A$ and the first terminal of the current source 720$_A$. In FIG. 7A, the second terminal of the switch 716$_A$ is coupled to the ground terminal 304, the second terminal of the resistor 702$_A$, and the second terminal of the switch 708$_A$.

The transistor 718$_A$ of FIG. 7A includes a PMOS FET rated for low voltage. In FIG. 7A, the control terminal of the transistor 718$_A$ is coupled to the first terminal of the resistor 702$_A$, the control terminal of the transistor 704$_A$, the first terminal of the transistor 704$_A$, and the control terminal of the transistor 710$_A$. Also, the first terminal of the transistor 718$_A$ is coupled to the first terminal of the switch 716$_A$ and the first terminal of the current source 720$_A$. In FIG. 7A, the second terminal of the transistor 718$_A$ is coupled to the control terminal of the transistor 440, the second terminal of the current source 720$_A$, and the second terminal of the resistor 722$_A$. As such, the second terminal of the transistor 718$_A$ operates as the fourth terminal of the SiC driver 332.

The current source 720$_A$ of FIG. 7A may be implemented and controlled by any suitable analog circuitry or digital circuitry. In FIG. 7A, the first terminal of the current source 720$_A$ is coupled to the first terminal of the switch 716$_A$ and the first terminal of the transistor 718$_A$. Also, the second terminal of the current source 720$_A$ is coupled to the control terminal of the transistor 440, the second terminal of the transistor 718$_A$, and the second terminal of the resistor 722$_A$.

The resistor 722$_A$ of FIG. 7A includes a polysilicon resistor. In FIG. 7A, the first terminal of the resistor 722$_A$ is coupled to the second terminal of the transistor 436, the second terminal of the transistor 440, the second terminal of the transistor 706$_A$, and the first terminal of the resistor 714$_A$. In FIG. 7A, the second terminal of the resistor 722$_A$ is coupled to the control terminal of the transistor 440, the second terminal of the transistor 718$_A$, and the second terminal of the current source 720$_A$.

The transistor 706$_A$ of FIG. 7A is implemented as a diode connected transistor. As such, the transistor 706$_A$ is biased into a saturation region of operation (e.g., always conducting current). In FIG. 7A, the transistor 706$_A$ is matched to the transistor 436 and the transistor 440. For example, the transistor 706$_A$ has the same dimensions as the transistor 436 and the transistor 440 and was manufactured under the same conditions as the transistor 436 and the transistor 440. As such, the threshold voltage to enable the transistor 706$_A$ is approximately the same as the threshold voltage to enable the transistor 436 and the transistor 440.

The transistor 710$_A$ and the resistor 714$_A$ of FIG. 7A form a source follower. As such, while current is flowing through the transistor 710$_A$, the voltage at the control terminal of the transistor 710$_A$ is approximately equal to the voltage at the second terminal of the transistor 710$_A$, or, more generally, the third terminal of the SiC driver 332. In example operation, before the switch 708$_A$ is enabled (e.g., closed), the gate terminal of the transistor 710$_A$ is charged to the threshold voltage of the transistor 706$_A$ (e.g., a diode connected transistor).

In situations in which the switch 708$_A$ of FIG. 7A is enabled, in-rush current towards the first terminal of the SiC driver 332 (e.g., the ground terminal 304) immediately charges the gate of the transistor 436 to the threshold voltage of the transistor 436. For example, the source follower formed by the transistor 710$_A$ and the resistor 714$_A$ charges the gate of the transistor 436 to the threshold voltage of the transistor 436 within 5 ns of the switch 708$_A$ being closed. As described above, the threshold voltage of the transistor 436 is matched to the threshold voltage of the transistor 706$_A$, which is diode connected.

As such, the voltage across the transistor 706$_A$ of FIG. 7A is approximately equal to the threshold voltage of the transistor 436. In FIG. 7A, after the in-rush current dissipates, the current source 712$_A$ continues to charge the control terminal of the transistor 436 beyond the threshold voltage to saturate the transistor 436. Also, in situations in which the switch 708$_A$ is disabled, the resistor 714$_A$ discharges the control terminal of the transistor 436.

In situations in which the switch 716$_A$ of FIG. 7A is enabled, in-rush current toward the first terminal of the SiC driver 332 (e.g., the ground terminal 304) immediately charges the gate of the transistor 440 to the threshold voltage of the transistor 440. For example, the source follower formed by the transistor 718$_A$ and the resistor 722$_A$ charges the gate of the transistor 440 to the threshold voltage of the transistor 440 within 5 ns of the switch 716$_A$ being closed. As described above, the threshold voltage of the transistor 440 is matched to the threshold voltage of the transistor 706$_A$, which is diode connected.

As such, the voltage across the transistor 706$_A$ is approximately equal to the threshold voltage of the transistor 440. In FIG. 7A, after the in-rush current dissipates, the current source 720$_A$ continues to charge the control terminal of the transistor 440 beyond the threshold voltage to saturate the transistor 440. Also, in situations in which the switch 716$_A$ is disabled, the resistor 722$_A$ discharges the control terminal of the transistor 440.

Matching between the transistor 706$_A$ and the transistor 436 of FIG. 7A ensures that the source follower formed by the transistor 710$_A$ and the resistor 714$_A$ can drive an accurate threshold voltage to enable the transistor 436 regardless of process, voltage, and temperature (PVT) variations. Also, the matching between the transistor 706$_A$ and the transistor 440 ensures that the source follower formed by the transistor 718$_A$ and the resistor 722$_A$ can drive an accurate threshold voltage to enable the transistor 440 regardless of PVT variations.

In examples described herein, the SiC driver 328 includes similar components connected in a similar manner as the SiC driver 332 but with respect to the transistor 460, the resistor 464, the transistor 478, and the transistor 482 instead of the transistor 418, the resistor 422, the transistor 436, and the transistor 440. For purposes of clarity, the structure and operation of the SiC driver 328 is not described further herein. Instead, the structure and operation of the SiC driver 332 similarly applies to the SiC driver 328 but with respect to the transistor 460, the resistor 464, the transistor 478, and the transistor 482 instead of the transistor 418, the resistor 422, the transistor 436, and the transistor 440. One distinction between the structure of the SiC driver 328 and the SiC driver 332 is the one or more source terminals, described further below, of the SiC driver 328 and the SiC driver 332. For example, in FIG. 4, the source terminal of the SiC driver 332 is coupled to the second terminal of the transistor 436 and the second terminal of the transistor 440 (e.g., the common mode voltage source 322) whereas the source terminal of the SiC driver 328 is coupled to the second terminal of the transistor 478.

Figure 7B:
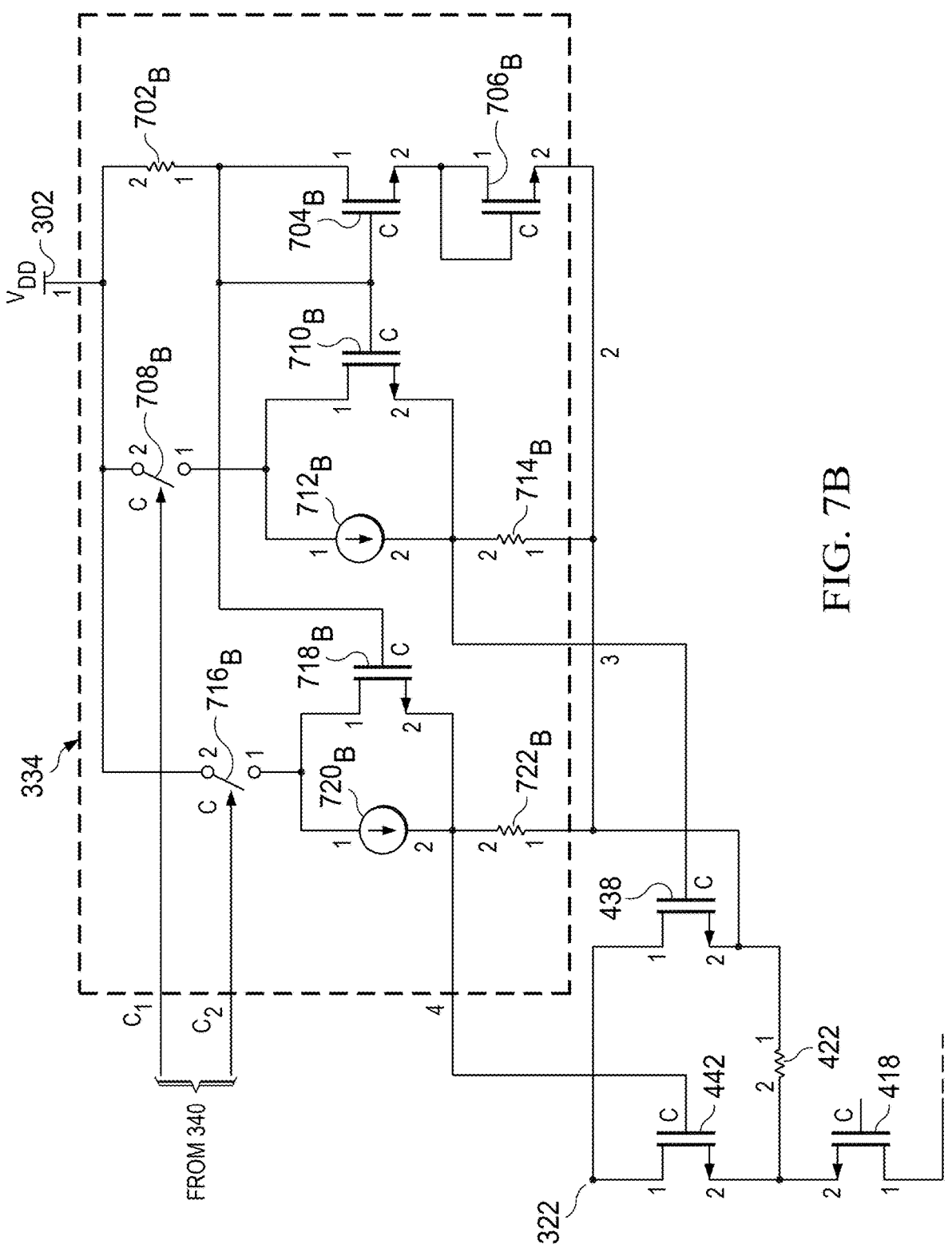
FIG. 7B is a block diagram of an example of the fourth SiC driver of FIGS. 3, 4, and 5.

FIG. 7B is a block diagram of an example of the SiC driver 334 of FIGS. 3, 4, and 5. In FIG. 7B, the SiC driver 334 includes a first example resistor $702_B$, a first example transistor $704_B$, a second example transistor $706_B$, a first example switch $708_B$, a third example transistor $710_B$, a first example current source $712_B$, and a second example resistor 714B. Also, the SiC driver 334 of FIG. 7B includes a second example switch $716_B$, a fourth example transistor $718_B$, a second example current source $720_B$, and a third example resistor $722_B$. In FIG. 7B, each of the transistor $704_B$, the transistor $706_B$, the transistor $710_B$, and the transistor $718_B$ includes an NMOS FET rated for low voltage.

In FIG. 7B, the SiC driver 334 includes similar components to the components of the SiC driver 332, but with N-channel devices instead of P-channel devices. Also, in FIG. 7B, the components of the SiC driver 334 are connected in a similar manner as the components of the SiC driver 332 but with respect to the supply terminal 302, the transistor 438, and the transistor 442 instead of the ground terminal 304, the transistor 436, and the transistor 440. For purposes of clarity, the structure and operation of the SiC driver 334 is not described further herein. Instead, the structure and operation of SiC driver 332 similarly applies to the SiC driver 334 but with respect to the supply terminal 302, the transistor 438, and the transistor 442 instead of the ground terminal 304, the transistor 436, and the transistor 440. One distinction between the structure of the SiC driver 334 and the SiC driver 332 is the one or more source terminals, described further below, of the SiC driver 334 and the SiC driver 332. For example, in FIG. 7B, the source terminal of the SiC driver 334 is coupled to the second terminal of the transistor 438 whereas the source terminal of the SiC driver 332, in FIG. 7A, is coupled to the second terminal of the transistor 436 and the second terminal of the transistor 440 (e.g., the common mode voltage source 322).

Also, in examples described herein, the SiC driver 330 includes similar components connected in a similar manner as the SiC driver 334 but with respect to the transistor 460, the resistor 464, the transistor 480, and the transistor 484 instead of the transistor 418, the resistor 422, the transistor 438, and the transistor 442. For purposes of clarity, the structure and operation of the SiC driver 330 is not described further herein. Instead, the structure and operation of the SiC driver 334 similarly applies to the SiC driver 330 but with respect to the transistor 460, the resistor 464, the transistor 480, and the transistor 484 instead of the transistor 418, the resistor 422, the transistor 438, and the transistor 442. One distinction between the structure of the SiC driver 330 and the SiC driver 334 is the one or more source terminals, described further below, of the SiC driver 330 and the SiC driver 334. For example, as illustrated in FIG. 4, the source terminal of the SiC driver 334 is coupled to the second terminal of the transistor 438 whereas the source terminal of the SiC driver 330 is coupled to the second terminal of the transistor 480 and the second terminal of the transistor 484 (e.g., the common mode voltage source 322).

Each of the transistor $704_A$, the transistor $706_A$, the transistor $710_A$, and the transistor $718_A$ of FIG. 7A is a P-channel MOSFET. Alternatively, one or more of the transistor $704_A$, the transistor $706_A$, the transistor $710_A$, or the transistor $718_A$ may be a P-channel FET, a P-channel IGBT, a P-channel JFET, an PNP BJT or, with slight modifications, an N-channel equivalent device. In FIG. 7B, each of the transistor $704_B$, the transistor $706_B$, the transistor $710_B$, and the transistor $718_B$ is an N-channel MOSFET. Alternatively, one or more of the transistor 704, the transistor $706_B$, the transistor $710_B$, or the transistor 7188 may be an N-channel FET, an N-channel IGBT, an N-channel JFET, an NPN BJT, or, with slight modifications, a P-channel equivalent device. One or more of the transistor $704_A$, the transistor $706_A$, the transistor $710_A$, the transistor $718_A$, the transistor $704_B$, the transistor $706_B$, the transistor $710_B$, or the transistor $718_B$ may be a depletion mode device, a drain-extended device, an enhancement mode device, a natural transistor or other type of device structure transistor. Furthermore, one or more of the transistor $704_A$, the transistor $706_A$, the transistor $710_A$, the transistor $718_A$, the transistor $704_B$, the transistor $706_B$, the transistor $710_B$, or the transistor $718_B$ may be implemented in/over an Si substrate, a SiC substrate, a GaN substrate, or a GaAs substrate.

As illustrated in FIGS. 7A and 7B, the SiC driver 332 and the SiC driver 334 immediately charge the control terminals of the transistor 436 and the transistor 438, respectively, to respective threshold voltages. Similarly, the SiC driver 332 and the SiC driver 334 immediately charge the control terminals of the transistor 440 and the transistor 442, respectively, to respective threshold voltages. As such, the SiC driver 332 and the SiC driver 334 prevent mismatch in turn-on time between the transistor 436, the transistor 438, the transistor 440, and the transistor 442.

For example, Equation 1 and Equation 2 below illustrate example matching between components of the SiC driver 332 and the SiC driver 334 to prevent mismatch in turn-on time and ensure synchronization.

$$\frac{\mu_{436}}{\mu_{438}} = \frac{W_{436}}{W_{438}} = \frac{I_{712_A}}{I_{712_B}} = \frac{R_{714_A}}{R_{714_B}} \qquad \text{Equation 1}$$

$$\frac{\mu_{440}}{\mu_{442}} = \frac{W_{440}}{W_{442}} = \frac{I_{720_A}}{I_{720_B}} = \frac{R_{722_A}}{R_{722_B}} \qquad \text{Equation 2}$$

In Equation 1, 1436 represents the charge mobility of the transistor 436, $\mu_{438}$ represents the charge mobility of the transistor 438, $W_{436}$ represents the width of the transistor 436, and $W_{438}$ represents the width of the transistor 438. Also, in Equation 1, $I_{712_A}$ represents the current produced by the current source $712_A$, $I_{712_B}$ represents the current produced by the current source $712_B$, $R_{714_A}$ represents the resistance of the resistor $714_A$, and $R_{714_B}$ represents the resistance of the resistor 714B.

In Equation 2, 1440 represents the charge mobility of the transistor 440, u 442 represents the charge mobility of the transistor 442, $W_{440}$ represents the width of the transistor 440, and $W_{442}$ represents the width of the transistor 442. Also, in Equation 1, $I_{720_A}$ represents the current produced by the current source $720_A$, $I_{720_B}$ represents the current produced by the current source $720_B$, $R_{722_A}$ represents the resistance of the resistor $722_A$, and $R_{722_B}$ represents the resistance of the resistor $722_B$. As described above, the SiC driver 328 and the SiC driver 330 operate similarly with respect to the transistor 478, the transistor 480, the transistor 482, and the transistor 484. Similar matching between components as illustrated in Equation 1 and Equation 2 is also present in the components of the SiC driver 328 and the SiC driver 330. Thus, the SiC driver 328, the SiC driver 330, the SiC driver 332, and the SiC driver 334 are matched.

As such, turn-on time for the transistor 436, the transistor 438, the transistor 440, the transistor 442, the transistor 478, the transistor 480, the transistor 482, and the transistor 484 is synchronized. Also, as described above, the transistor 436, the transistor 438, the transistor 440, the transistor 442, the transistor 478, the transistor 480, the transistor 482, and the transistor 484 are charged to respective threshold voltages regardless of PVT variations. As such, examples described herein improve symmetry in the common mode voltage of the transceiver 106.

For example, the common mode voltage is determined as the quotient of (1) the sum of the voltage at the CAN high terminal 306 and the voltage at the CAN low terminal and (2) the voltage on the communication bus 108 during the recessive state $$\left( \text{e.g.,}\ V_{CM} = \frac{V_{CANH} + V_{CANL}}{V_{REC}} \right).$$

By synchronizing turn-on time for the transistor 436, the transistor 438, the transistor 440, the transistor 442, the transistor 478, the transistor 480, the transistor 482, and the transistor 484, examples described herein improve tracking between the CAN high signal and the CAN low signal as the differential voltage on the communication bus 108 collapses. As such, examples described herein improve symmetry between the CAN high signal and the CAN low signal to within 5% of one another.

In FIGS. 7A and 7B, both the SiC driver 332 and the SiC driver 334 have a source terminal at which the SiC driver 332 and the SiC driver 334 interface with a transistor to be driven. For example, a source terminal is a terminal at which a driver connects to a source terminal of a transistor to be driven. In FIG. 7A, the second terminal of the SiC driver 332 is a source terminal for the transistor 436 and the transistor 440. Also, in FIG. 7B, the second terminal of the SiC driver 334 is a source terminal for the transistor 438. In FIGS. 7A and 7B, the transistor 436 is a PMOS FET and the transistor 438 is an NMOS FET together forming a first complementary metal-oxide semiconductor (CMOS) transistor. Also, the transistor 440 is a PMOS FET and the transistor 442 is an NMOS FET together forming a second CMOS transistor. In PMOS FETs, whichever of the first terminal and the second terminal is at a higher voltage behaves like the source terminal. In NMOS FETs, whichever of the first terminal and the second terminal is at a lower voltage behaves like the source terminal.

Referring to FIG. 4, before the SiC switch 312 and the SiC switch 314 are enabled, the voltage at the CAN high terminal 306 is 3.5 V, the voltage at the first terminal of the transistor 460 and the first terminal of the resistor 464 is 4 V, the voltage at the common mode voltage source 322 is 2.5 V, the voltage at the CAN low terminal 308 is 1.5 V, and the voltage at the first terminal of the transistor 418 and the first terminal of the resistor 422 is 1 V. As such, one terminal of the transistor 436, the transistor 438, the transistor 440, and the transistor 442 is at 2.5 V and the other terminal of the transistor 436, the transistor 438, the transistor 440, and the transistor 442 is at 1 V, both voltages being different than the voltages at the CAN high terminal 306 and the CAN low terminal 308. Thus, proper driving of the first CMOS transistor and the second CMOS transistor is dependent on proper selection of the connection point for the source terminals of the SiC driver 332 and the SiC driver 334.

By coupling the source terminal of the SiC driver 332 of FIG. 7A to respective second terminals (e.g., source terminals) of the transistor 436 and the transistor 440 (e.g., P-channel devices) that are at a higher voltage than respective first terminals (e.g., drain terminals) of the transistor 436 and the transistor 440, examples described herein ensure that the SiC driver 332 enables the transistor 436 and the transistor 440. For example, the source terminal of the SiC driver 332 is coupled to the second terminals of the transistor 436 and the transistor 440 which are also coupled to the common mode voltage source 322.

The source terminal of the SiC driver 334 of FIG. 7B is coupled to the second terminal (e.g., a source terminal) of the transistor 438 (e.g., an N-channel device) that is at a lower voltage than the first terminal (e.g., a drain terminal) of the transistor 438. In FIGS. 7A and 7B, the second terminal (e.g., a source terminal) of the transistor 442 (e.g., an N-channel device) is coupled to the second terminal of the transistor 418.

Before current is flowing through the resistor 422, the voltage at the second terminal of the transistor 438 (e.g., the source terminal of the SiC driver 334) is the same as the voltage at the second terminal of the transistor 442. Thus, respective second terminals (e.g., source terminals) of the transistor 438 and the transistor 442 (e.g., N-channel devices) are at a higher voltage than respective first terminals (e.g., drain terminals) of the transistor 438 and the transistor 442. As such, examples described herein ensure that the SiC driver 334 enables the transistor 438 and the transistor 442.

FIG. 8 is a flowchart representative of at least one of example machine-readable instructions or example operations 800 that may be at least one of executed, instantiated, or performed using example programmable circuitry of the SiC driver 332 of FIG. 7A and the SiC driver 334 of FIG. 7B. As described above, the SiC driver 328 and the SiC driver 330 are implemented similarly to the SiC driver 332 and the SiC driver 334. As such, operation described with respect to at least one of the SiC driver 332 or the SiC driver 334 is likewise applicable to at least one of the SiC driver 328 or the SiC driver 330, respectively.

At block 802, the SiC driver 332 charges a gate terminal of a first source follower transistor of a first driver based on a first threshold voltage set by a first diode connected transistor matched to a first transistor to be driven by the first driver. For example, the SiC driver 332 charges the control terminal of the transistor 710$_A$ based on a first threshold voltage set by the transistor 706$_A$ which is matched to the transistor 436 to be driven by the SiC driver 332. In FIG. 8, at block 804, the SiC driver 334 charges a gate terminal of a second source follower transistor of a second driver based on a second threshold voltage set by a second diode connected transistor matched to a second transistor to be driven by the second driver.

For example, the SiC driver 334 charges the control terminal of the transistor 710$_B$ based on a second threshold voltage set by the transistor 706B which is matched to the transistor 438 to be driven by the SiC driver 334. In FIG. 8, at block 806, based on current flowing through a bus switch (e.g., the CAN switch 316) being disabled, the SiC driver 332 charges a gate terminal of the first transistor to the first threshold voltage. For example, the control circuitry 340 closes the switch 708$_A$ based on current flowing through the bus switch being disabled. Based on the control circuitry 340 closing the switch 708$_A$ of the SiC driver 332, the SiC driver 332 charges the control terminal of the transistor 436 to the first threshold voltage.

At block 808, based on current flowing through a bus switch (e.g., the CAN switch 316) being disabled, the SiC driver 334 charges a gate terminal of the second transistor to the second threshold voltage. For example, the control circuitry 340 closes the switch 708$_B$ based on current flowing through the bus switch being disabled. Based on the control circuitry 340 closing the switch 708$_B$ of the SiC driver 334, the SiC driver 334 charges the control terminal of the transistor 438 to the second threshold voltage.

At block 810, using a first current source of the first driver, the SiC driver 332 continues to charge the gate terminal of the first transistor beyond the first threshold voltage to saturate the first transistor. For example, using the current source 712$_A$, the SiC driver 332 continues to charge the control terminal of the transistor 436 beyond the first threshold voltage to saturate the transistor 436. In FIG. 8, at block 812, using a second current source of the second driver, the SiC driver 334 continues to charge the gate terminal of the second transistor beyond the second threshold voltage to saturate the second transistor. For example, using the current source 712$_B$, the SiC driver 334 continues to charge the control terminal of the transistor 438 beyond the second threshold voltage to saturate the transistor 438.

At block 814, after a threshold period, the SiC driver 332 discharges the gate terminal of the first transistor through a first resistor of the first driver. For example, after the threshold period, the control circuitry 340 opens the switch 708$_A$. Based on the control circuitry 340 opening the switch 708$_A$, the SiC driver 332 discharges the control terminal of the transistor 436 through the resistor 714$_A$ of the SiC driver 332.

At block 816, after the threshold period, the SiC driver 334 discharges the gate terminal of the second transistor through a second resistor of the second driver. For example, after the threshold period, the control circuitry 340 opens the switch 708$_B$. Based on the control circuitry 340 opening the switch 708$_B$, the SiC driver 334 discharges the control terminal of the transistor 438 through the resistor 714B of the SiC driver 334.

A ratio between respective characteristics (e.g., charge mobility, width, etc.) of the first transistor (e.g., the transistor 436) and the second transistor (e.g., the transistor 438) is approximately equal to a ratio between respective currents produced by the first current source (e.g., the current source 712$_A$) and the second current source (e.g., the current source 712$_B$). Also, the ratio between respective characteristics of the first transistor (e.g., the transistor 436) and the second transistor (e.g., the transistor 438) is approximately equal to and a ratio between respective resistances of the first resistor (e.g., the resistor 714$_A$) and the second resistor (e.g., the resistor 714B). In FIG. 8, the SiC driver 332 and the SiC driver 334 perform similar operations with respect to the transistor 440 and the transistor 442, respectively, based on signals from the control circuitry 340 as described above.

Figure 9:
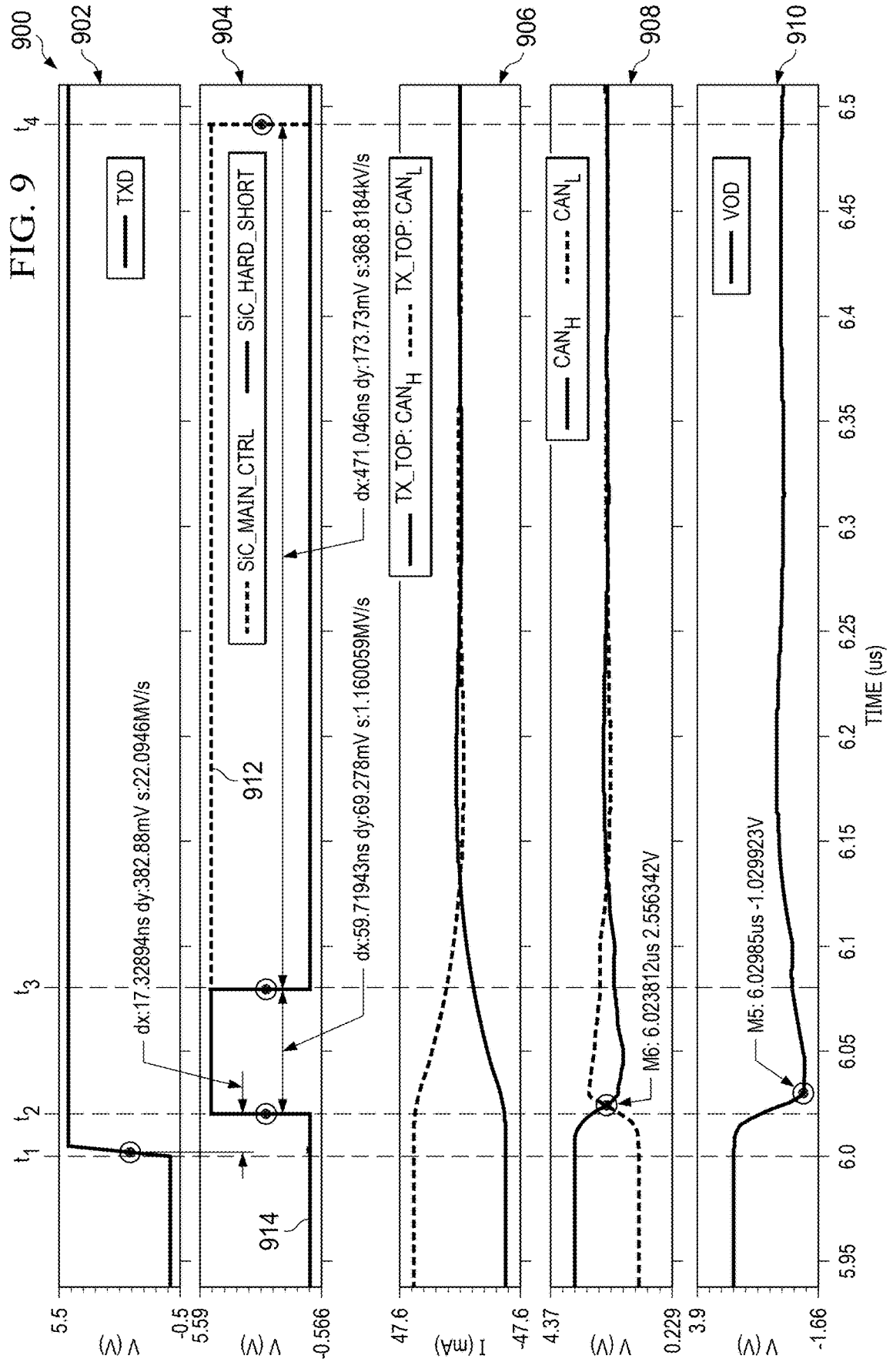
FIG. 9 is a graphical illustration depicting example operation of the transceiver of FIG. 3.

FIG. 9 is a graphical illustration 900 depicting example operation of the transceiver 106 of FIG. 3. In FIG. 9, the graphical illustration 900 includes a first example plot 902, a second example plot 904, a third example plot 906, a fourth example plot 908, and a fifth example plot 910. In FIG. 9, the plot 902 depicts a control signal to the CAN driver 338 and the plot 904 depicts a first example control signal 912 to the SiC driver 332 and the SiC driver 334 and a second example control signal 914 to the SiC driver 332 and the SiC driver 334.

The plot 906 of FIG. 9 depicts current flowing through the CAN high terminal 306 and the CAN low terminal 308. In FIG. 9, the plot 908 depicts voltages at the CAN high terminal 306 and the CAN low terminal 308. Also, the plot 910 depicts an enlarged view of the voltage at the CAN high terminal 306. In FIG. 9, at a first time (e.g., 11), the control circuitry 340 sets the control signal of the plot 902 to a logic high value to taper the current flowing through the CAN switch 316. For example, the control circuitry 340 sets the control signal of the plot 902 to a logic high value to transition the communication bus 108 from a dominant state (e.g., a 0-bit) to a recessive state (e.g., a 1-bit).

After a first threshold period, at a second time (e.g., $t_2$), the control circuitry 340 sets the control signal 912 to a logic high value. Responsive to the control signal 912, the SiC driver 332 closes the transistor 436 and the SiC driver 334 closes the transistor 438. Also, at the second time (e.g., $t_2$), the control circuitry 340 sets the control signal 914 to a logic high value. Responsive to the control signal 914, the SiC driver 332 closes the transistor 440 and the SiC driver 334 closes the transistor 442. In FIG. 9, after a second threshold period, at a third time (e.g., $t_3$), the control circuitry 340 sets the control signal 914 to a logic low value. Responsive to the control signal 914, the SiC driver 332 opens the transistor 440 and the SiC driver 334 opens the transistor 442.

After a third threshold period, at a fourth time (e.g., $t_4$), the control circuitry 340 sets the control signal 912 to a logic low value. Responsive to the control signal 912, the SiC driver 332 opens the transistor 436 and the SiC driver 334 opens the transistor 438. As illustrated in the plot 906, the plot 908, and the plot 910, ringing (e.g., transient signals) on the communication bus 108 are reduced (e.g., compared to the example of FIG. 2B). Accordingly, examples described herein increase the data rate at which the CAN standard can be utilized, reduce EMI, and improve operation of transceivers.

Figure 10:
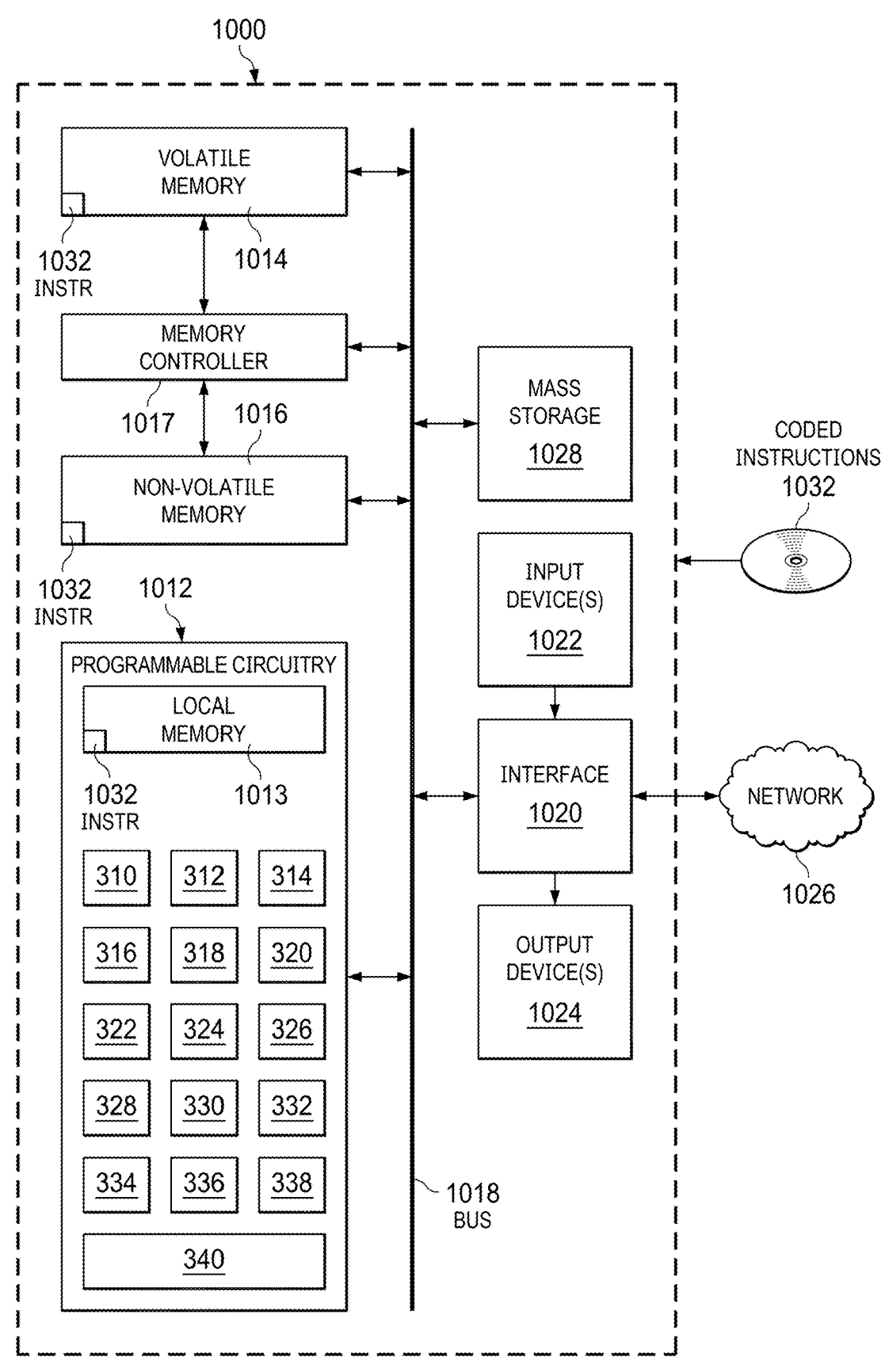
FIG. 10 is a block diagram of an example processing platform including programmable circuitry structured to execute, instantiate, or perform the example machine-readable instructions or perform the example operations of at least one of FIG. 6 or 8 to implement the transceiver of FIG. 3.

FIG. 10 is a block diagram of an example programmable circuitry platform 1000 structured to execute, instantiate, or perform the example machine-readable instructions or perform the example operations of at least one of FIG. 6 or 8 to implement the transceiver 106 of FIG. 3. The programmable circuitry platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, or microcontrollers from any desired family or manufacturer. The programmable circuitry 1012 may be implemented by one or more semiconductor based (e.g., silicon based) devices. In this example, the programmable circuitry 1012 implements the example CAN switch 310, the example SiC switch 312, the example SiC switch 314, the example CAN switch 316, the example common mode resistor 318, the example common mode resistor 320, the example common mode voltage source 322, the example CAN driver 324, the example CAN driver 326, the example SiC driver 328, the example SiC driver 330, the example SiC driver 332, the example SiC driver 334, the example CAN driver 336, the example CAN driver 338, and the example control circuitry 340.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by one or more Synchronous Dynamic Random Access Memory (SDRAM), Dynamic Random Access Memory (DRAM), RAMBUS® Dynamic Random Access Memory (RDRAM®), or any other type of RAM device. The non-volatile memory 1016 may be implemented by one or a combination of flash memory or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in according to any type of interface standard, such as an Ethernet interface, a universal serial bus (USB) interface, a Bluetooth® interface, a near field communication (NFC) interface, a Peripheral Component Interconnect (PCI) interface, or a Peripheral Component Interconnect Express (PCIe) interface.

One or more input devices 1022 of FIG. 10 are connected to the interface circuitry 1020. The input device(s) 1022 permit(s) a user (e.g., a human user, a machine user, etc.) to enter one of or a combination of data or commands into the programmable circuitry 1012. The input device(s) 1022 can be implemented by, for example, one of or a combination of an audio sensor, a microphone, a camera (still or video), a keyboard, a button, a mouse, a touchscreen, a trackpad, a trackball, an isopoint device, or a voice recognition system.

One or more output devices 1024 are also connected to the interface circuitry 1020 of the illustrated example. The output device(s) 1024 can be implemented, for example, by one of or a combination of display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, or speaker. The interface circuitry 1020 of the illustrated example, thus, includes one of or a combination of a graphics driver card, a graphics driver chip, or graphics processor circuitry such as a GPU.

The interface circuitry 1020 of the illustrated example also includes a communication device such as one of or a combination of a transmitter, a receiver, a transceiver, a modem, a residential gateway, a wireless access point, or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1000 of the illustrated example also includes one or more mass storage discs or devices 1028 to store one or more of firmware, software, or data. Examples of such mass storage discs or devices 1028 include one or more magnetic storage devices (e.g., floppy disk, drives, HDDs, etc.), optical storage devices (e.g., Blu-ray disks, CDs, DVDs, etc.), RAID systems, or solid-state storage discs or devices such as flash memory devices and SSDs.

The machine-readable instructions 1032, which may be implemented by the machine-readable instructions of FIGS.

6 and 8, may be stored in one of or a combination of the mass storage device 1028, in the volatile memory 1014, in the non-volatile memory 1016, or on at least one non-transitory computer readable storage medium such as a CD or DVD which may be removable.

While an example manner of implementing the transceiver 106 of FIG. 1 is illustrated in FIGS. 3, 4, 5, 7A, and 7B, one or more of the elements, processes, or devices illustrated in FIGS. 3, 4, 5, 7A, and 7B may be combined, divided, re-arranged, omitted, eliminated, or implemented in any other way. Further, the example CAN switch 310, the example SiC switch 312, the example SiC switch 314, the example CAN switch 316, the example common mode resistor 318, the example common mode resistor 320, the example common mode voltage source 322, the example CAN driver 324, the example CAN driver 326, the example SiC driver 328, the example SiC driver 330, the example SiC driver 332, the example SiC driver 334, the example CAN driver 336, the example CAN driver 338, and the example control circuitry 340, or, more generally, the example transceiver 106 of FIG. 3, may be implemented by hardware alone or by hardware in combination with software and firmware. Thus, for example, any of the example CAN switch 310, the example SiC switch 312, the example SiC switch 314, the example CAN switch 316, the example common mode resistor 318, the example common mode resistor 320, the example common mode voltage source 322, the example CAN driver 324, the example CAN driver 326, the example SiC driver 328, the example SiC driver 330, the example SiC driver 332, the example SiC driver 334, the example CAN driver 336, the example CAN driver 338, and the example control circuitry 340, or, more generally, the example transceiver 106 of FIG. 3, could be implemented by programmable circuitry in combination with one or more machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), or field programmable logic device(s) (FPLD(s)) such as FPGAs. Further still, the example transceiver 106 of FIG. 3 may include one or more elements, processes, or devices in addition to, or instead of, those illustrated in FIG. 3, or may include more than one of any or all of the illustrated elements, processes and devices.

Flowchart(s) representative of example machine-readable instructions, which may be executed by programmable circuitry to at least one of implement or instantiate the transceiver 106 of FIG. 3 or representative of example operations which may be performed by programmable circuitry to at least one of implement or instantiate the transceiver 106 of FIG. 3, are shown in FIGS. 6 and 8. The machine-readable instructions may be one or more executable programs or portion(s) of one or more executable programs for execution by programmable circuitry such as the programmable circuitry 1012 shown in the example programmable circuitry platform 1000 described below in connection with FIG. 10 and may be one or more function(s) or portion(s) of functions to be performed by example programmable circuitry (e.g., an FPGA, a microprocessor, etc.) described herein. In some examples, the machine-readable instructions cause an operation, a task, etc., to be carried out or performed in an automated manner in the real-world. As used herein, "automated" means without human involvement.

The program may be embodied in instructions (e.g., at least one of software or firmware) stored on one or more of at least one non-transitory computer readable storage medium or at least one non-transitory machine-readable storage medium such as one of or a combination of cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EE-PROM), flash memory, etc.), volatile memory (e.g., Random Access Memory (RAM) of any type, etc.), or any other storage device or storage disk. The instructions of the at least one of the non-transitory computer readable or the non-transitory machine-readable medium may program or be executed by programmable circuitry located in one or more hardware devices, but the entire program or parts thereof could alternatively be executed or instantiated by one or more hardware devices other than the programmable circuitry or embodied in dedicated hardware. The machine-readable instructions may be distributed across multiple hardware devices or executed by two or more hardware devices (e.g., a server and a client hardware device). For example, the client hardware device may be implemented by an endpoint client hardware device (e.g., a hardware device associated with at least one of a human user or a machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 6 and 8, many other methods of implementing the example transceiver 106 may alternatively be used. For example, the order of execution of the blocks of the flowchart(s) may be changed, or some of the blocks described may be changed, eliminated, or combined. Also or alternatively, any or all of the blocks of the flow chart may be implemented by one or more hardware circuits (e.g., processor circuitry, discrete analog circuitry, discrete digital circuitry, integrated analog circuitry, integrated digital circuitry, an FPGA, an ASIC, a comparator, an operational-amplifier (op-amp), a logic circuit, etc.) structured to perform the corresponding operation without executing software or firmware. The programmable circuitry may be distributed in different network locations or local to one or more hardware devices (e.g., a single-core processor (e.g., a single core CPU), a multi-core processor (e.g., a multi-core CPU, an XPU, etc.)). For example, the programmable circuitry may be one of or a combination of a CPU or an FPGA located in the same package (e.g., the same integrated circuit (IC) package or in two or more separate housings), one or more processors in a single machine, multiple processors distributed across multiple servers of a server rack, multiple processors distributed across one or more server racks, etc., or any combination(s) thereof.

The machine-readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, or produce machine executable instructions. For example, the machine-readable instructions may be fragmented and stored on one or more storage devices, disks or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to render them directly readable, interpretable, or executable by a computing device or other machine. For example, the machine-readable instructions may be stored in multiple parts, which are individually compressed, encrypted, or stored on separate computing devices, where the parts after being decrypted, decompressed, or combined form a set of one or more computer-executable or machine executable instructions that implement one or more functions or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions or the corresponding program(s) can be executed in whole or in part. Thus, machine-readable, computer readable or machine-readable media, as used herein, may include one or a combination of instructions and program(s) regardless of the particular format or state of the machine-readable instructions or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6 and 8 may be implemented using executable instructions (e.g., at least one of computer readable instructions or machine-readable instructions) stored on one or more non-transitory computer readable or machine-readable media. As used herein, the terms non-transitory computer readable medium, non-transitory computer readable storage medium, non-transitory machine-readable medium, and non-transitory machine-readable storage medium are expressly defined to include any type of computer readable storage device or storage disk and to exclude propagating signals and to exclude transmission media. Examples of such non-transitory computer readable medium, non-transitory computer readable storage medium, non-transitory machine-readable medium, or non-transitory machine-readable storage medium include one or more optical storage devices, magnetic storage devices, an HDD, a flash memory, a read-only memory (ROM), a CD, a DVD, a cache, a RAM of any type, a register, or any other storage device or storage disk in which information is stored for any duration (e.g., for extended time periods, permanently, for brief instances, for temporarily buffering, for caching of the information). As used herein, the terms "non-transitory computer readable storage device" and "non-transitory machine-readable storage device" are defined to include any physical (mechanical, magnetic, electromechanical, or electrical) hardware to retain information for a time period, but to exclude propagating signals and to exclude transmission media. Examples of non-transitory computer readable storage devices or non-transitory machine-readable storage devices include one or a combination of random-access memory of any type, read only memory of any type, solid state memory, flash memory, optical discs, magnetic disks, disk drives, or redundant array of independent disks (RAID) systems. As used herein, the term "device" refers to physical structure such as one of or a combination of mechanical, electromechanical, or electrical equipment, hardware, or circuitry that may or may not be configured by computer readable instructions, machine-readable instructions, etc., or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, where the phrase "at least" is used as the transition term in, for example, a preamble of a claim, it is open-ended in the same manner as the term "comprising" and "including" are open ended. As used herein in the context of describing structures, components, items, objects and things, the phrase "at least one of A and B" refers to implementations including any of (1) at least one A, (2) at least one B, or (3) at least one A and at least one B. Similarly, as used herein in the context of describing structures, components, items, objects and things, the phrase "at least one of A or B" refers to implementations including any of (1) at least one A, (2) at least one B, or (3) at least one A and at least one B. As used herein in the context of describing the performance or execution of processes, instructions, actions, activities, etc., the phrase "at least one of A and B" refers to implementations including any of (1) at least one A, (2) at least one B, or (3) at least one A and at least one B. Similarly, as used herein in the context of describing the performance or execution of processes, instructions, actions, activities, etc., the phrase "at least one of A or B" refers to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Also, although individual features may be included in different examples or claims, these may possibly be combined, and the inclusion in different examples or claims does not imply that a combination of features is at least one of not feasible or advantageous.

As used herein, connection references (e.g., attached, coupled, connected, and joined) may include intermediate members between the elements referenced by at least one of the connection reference or relative movement between those elements unless otherwise indicated. As such, connection references do not necessarily infer that two elements are directly connected or in fixed relation to each other.

Unless specifically stated otherwise, descriptors such as "first," "second," "third," etc., are used herein without imputing or otherwise indicating any meaning of priority, physical order, arrangement in a list, or ordering in any way, but are merely used as at least one of labels or arbitrary names to distinguish elements for case of understanding the described examples. In some examples, the descriptor "first" may be used to refer to an element in the detailed description, while the same element may be referred to in a claim with a different descriptor such as "second" or "third." In such instances, such descriptors are used merely for identifying those elements distinctly within the context of the discussion (e.g., within a claim) in which the elements might, for example, otherwise share a same name.

As used herein, the phrase "in communication," including variations thereof, encompasses one of or a combination of direct communication or indirect communication through one or more intermediary components, and does not require direct physical (e.g., wired) communication or constant communication, but rather also includes selective communication at least one of periodic intervals, scheduled intervals, aperiodic intervals, or one-time events.

As used herein, "programmable circuitry" is defined to include at least one of (i) one or more special purpose electrical circuits (e.g., an application specific circuit (ASIC)) structured to perform specific operation(s) and including one or more semiconductor-based logic devices (e.g., electrical hardware implemented by one or more transistors), or (ii) one or more general purpose semiconductor-based electrical circuits programmable with instructions to perform one or more specific functions(s) or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations or functions, Field Programmable Gate Arrays (FPGAs) that may be programmed with second instructions to at least one of configure or structure the FPGAs to instantiate one or more operations or functions corresponding to the first instructions, Graphics Processor Units (GPUs) that may execute first instructions to perform one or more operations or functions, Digital Signal Processors (DSPs) that may execute first instructions to perform one or more operations or functions, XPUs, Network Processing Units (NPUs) one or more microcontrollers that may execute first instructions to perform one or more operations or functions or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., at least one of programmed or hardwired) at a time of manufacturing by a manufacturer to at least one of perform the function or be configurable (or re-configurable) by a user after manufacturing to perform the function/or other additional or alternative functions. The configuring may be through at least one of firmware or software programming of the device, through at least one of a construction or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

In the description and claims, described "circuitry" may include one or more circuits. A circuit or device that is described herein as including certain components may instead be adapted to be coupled to those components to form the described circuitry or device. For example, a structure described as including one or more semiconductor elements (such as transistors), one or more passive elements (such as one of or a combination of resistors, capacitors, or inductors), or one or more sources (such as at least one of voltage sources or current sources) may instead include only the semiconductor elements within a single physical device (e.g., at least one of a semiconductor die or integrated circuit (IC) package) and may be adapted to be coupled to at least some of the passive elements or the sources to form the described structure either at a time of manufacture or after a time of manufacture, for example, by at least one of an end-user or a third-party.

Circuits described herein are reconfigurable to include the replaced components to provide functionality at least partially similar to functionality available prior to the component replacement. Components shown as resistors, unless otherwise stated, are generally representative of any one or more elements coupled in at least one of series or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and some features illustrated as being internal to the integrated circuit may be incorporated outside of the integrated. As used herein, the term "integrated circuit" means one or more circuits that are at least one of: (i) incorporated in/over a semiconductor substrate; (ii) incorporated in a single semiconductor package; (iii) incorporated into the same module; or (iv) incorporated in/on the same printed circuit board.

Uses of the phrase "ground" in the foregoing description include at least one of a chassis ground, an Earth ground, a floating ground, a virtual ground, a digital ground, a common ground, or any other form of ground connection applicable to, or suitable for, the teachings of this description. As used herein, "approximately" and "about" modify their subjects/values to recognize the potential presence of variations that occur in real world applications. For example, "approximately" and "about" may modify values that may not be exact due to at least one of manufacturing tolerances or other real-world imperfections. Unless otherwise stated, "about," "approximately," or "substantially" preceding a value means+/−10 percent of the stated value, or, if the value is zero, a reasonable range of values around zero.

Modifications are possible in the described examples, and other examples are possible, within the scope of the claims.

From the foregoing, it will be appreciated that example systems, apparatus, articles of manufacture, and methods have been described that reduce ringing (e.g., at least one of undershoot or overshoot) on a communication bus. For example, as described above, example control circuitry described herein delays turn-on of example SiC switches (e.g., for a first threshold period). Also, as described above, example SiC switches described herein include a very small resistance (e.g., 10 Ohms) to allow for increased dissipation of transient signals on an example communication bus. As described above, by matching transistors in example SiC drivers to transistors to be driven, examples described herein improve symmetry in the common mode voltage of a transceiver regardless of PVT variations.

Also, by synchronizing turn-on time for transistors driven by example SiC drivers (e.g., using at least one of matched (e.g., identical) SiC switches or matched (e.g., identical) drivers), examples described herein improve tracking between the CAN high signal and the CAN low signal as the differential voltage on a communication bus collapses. Described systems, apparatus, articles of manufacture, and methods improve the efficiency of using a computing device by reducing ringing behavior in a transceiver and improving and EMC of a transceiver. Described systems, apparatus, articles of manufacture, and methods are also directed to one or more improvement(s) in the operation of a machine such as a computer or other electronic, electromechanical, or mechanical device.

What is claimed is:

1. A transceiver comprising:

a resistor having a first terminal and a second terminal coupled to a communication bus terminal;

a first transistor having a control terminal, a first terminal coupled to the first terminal of the resistor, and a second terminal coupled to a common mode voltage terminal;

a second transistor having a control terminal, a first terminal coupled to the second terminal of the resistor, and a second terminal coupled to the common mode voltage terminal; and a first driver having a first terminal coupled to a ground terminal, a second terminal coupled to the second terminal of the first transistor and the second terminal of the second transistor, a third terminal coupled to the control terminal of the first transistor, and a fourth terminal coupled to the control terminal of the second transistor.

2. The transceiver of claim 1, further including:
a current mirror having a first terminal and a second terminal;
a current source having a first terminal coupled to the second terminal of the current mirror;
a third transistor having a control terminal, a first terminal coupled to the communication bus terminal, and a second terminal coupled to the first terminal of the current mirror; and
a second driver having a first terminal coupled to a supply terminal, and a second terminal coupled to the control terminal of the third transistor.

3. The transceiver of claim 2, wherein:
the transceiver further includes control circuitry;
the second driver is configured to enable the third transistor;
the current source is configured to taper current flowing through the third transistor over a first period responsive to a first control signal from the control circuitry;
after the first period, the first driver is configured to enable the first transistor and the second transistor responsive to a second control signal from the control circuitry;
after a second period, the first driver is configured to disable the second transistor responsive to a third control signal from the control circuitry; and
after a third period, the first driver is configured to disable the first transistor responsive to a fourth control signal from the control circuitry.

4. The transceiver of claim 2, further including:
a fourth transistor coupled between the communication bus terminal and the first terminal of the third transistor, the fourth transistor having a control terminal, a first terminal coupled to the communication bus terminal, and a second terminal coupled to the first terminal of the third transistor;
a fifth transistor between the second terminal of the resistor and the first terminal of the third transistor, the fifth transistor having a control terminal, a first terminal coupled to the first terminal of the third transistor, and a second terminal coupled to the second terminal of the resistor;
a sixth transistor having a control terminal, a first terminal coupled to the common mode voltage terminal, and a second terminal coupled to the first terminal of the resistor; and
a seventh transistor having a control terminal, a first terminal coupled to the common mode voltage terminal, and a second terminal coupled to the second terminal of the resistor.

5. The transceiver of claim 4, wherein the resistor is a first resistor, the second driver has a third terminal coupled to the ground terminal and a fourth terminal coupled to the control terminal of the fourth transistor, and the transceiver further includes:
a third driver having a first terminal coupled to the supply terminal, a second terminal coupled to the second terminal of the sixth transistor, a third terminal coupled to the control terminal of the sixth transistor, and a fourth terminal coupled to the control terminal of the seventh transistor;
a second resistor having a first terminal and a second terminal coupled to the second terminal of the fifth transistor; and a switch having a first terminal coupled to the first terminal of the first transistor and the second terminal of the sixth transistor and a second terminal coupled to the first terminal of the second resistor.

6. The transceiver of claim 5, wherein:
the transceiver further includes control circuitry;
the second driver is configured to enable the third transistor and the fourth transistor;
responsive to a first control signal from the control circuitry, the current source is configured to taper current flowing through the third transistor and the fourth transistor over a first period;
after the first period:
the first driver is configured to enable the first transistor and the second transistor responsive to a second control signal from the control circuitry; and
the third driver is configured to enable the sixth transistor and the seventh transistor responsive to the second control signal from the control circuitry;
after a second period:
the first driver is configured to disable the second transistor responsive to a third control signal from the control circuitry; and
the third driver is configured to disable the seventh transistor responsive to the third control signal from the control circuitry; and
after a third period:
the first driver is configured to disable the first transistor responsive to a fourth control signal from the control circuitry; and
the third driver is configured to disable the sixth transistor responsive to the fourth control signal from the control circuitry.

7. An apparatus comprising:
a first resistor having a first terminal and a second terminal coupled to a voltage terminal;
a first transistor having a control terminal, a first terminal, and a second terminal, the first terminal of the first transistor coupled to the control terminal of the first transistor and the first terminal of the first resistor;
a second transistor having a control terminal, a first terminal coupled to the control terminal of the second transistor and the second terminal of the first transistor, and a second terminal to be coupled to a source terminal of a third transistor;
a switch having a control terminal, a first terminal, and a second terminal coupled to the voltage terminal;
a current source having a first terminal coupled to the first terminal of the switch and a second terminal to be coupled to a gate terminal of the third transistor;
a fourth transistor having a control terminal coupled to the control terminal of the first transistor, a first terminal coupled to the first terminal of the switch, and a second terminal to be coupled to the gate terminal of the third transistor; and
a second resistor having a first terminal to be coupled to the source terminal of the third transistor and a second terminal to be coupled to the gate terminal of the third transistor.

8. The apparatus of claim 7, wherein the third transistor is an n-channel transistor and the voltage terminal is a ground terminal.

9. The apparatus of claim 7, wherein the third transistor is a p-channel transistor and the voltage terminal is a supply terminal.

10. The apparatus of claim 7, wherein the third transistor is a first p-channel transistor, and the second transistor is a second p-channel transistor matched to the first p-channel transistor.

11. The apparatus of claim 7, wherein the third transistor is a first n-channel transistor, and the second transistor is a second n-channel transistor matched to the first n-channel transistor.

12. A system comprising:
a current source having a control terminal and a first terminal;
a current mirror having a first terminal and a second terminal coupled to the first terminal of the current source;
a first transistor having a control terminal, a first terminal coupled to a communication bus terminal, and a second terminal coupled to the first terminal of the current mirror;
a first driver having a control terminal, a first terminal coupled to a supply terminal, and a second terminal coupled to the control terminal of the first transistor;
a resistor having a first terminal and a second terminal coupled to the first terminal of the first transistor;
a second transistor having a control terminal, a first terminal coupled to the first terminal of the resistor, and a second terminal coupled to a common mode voltage terminal;
a second driver having a control terminal, a first terminal coupled to a ground terminal, a second terminal coupled to the second terminal of the second transistor, and a third terminal coupled to the control terminal of the second transistor;
a third transistor having a control terminal, a first terminal coupled to the common mode voltage terminal, and a second terminal coupled to the second terminal of the resistor;
a third driver having a control terminal, a first terminal coupled to the supply terminal and a second terminal coupled to the control terminal of the third transistor; and
control circuitry having a first output terminal coupled to the control terminal of the first driver, a second output terminal coupled to the control terminal of the second driver, a third output terminal coupled to the control terminal of the third driver, and a fourth output terminal coupled to the control terminal of the current source.

13. The system of claim 12, wherein the resistor is a first resistor, the current source is a first current source, and the second driver includes:
a second resistor having a first terminal and a second terminal coupled to the ground terminal;
a fourth transistor having a control terminal, a first terminal, and a second terminal, the first terminal of the fourth transistor coupled to the control terminal of the fourth transistor and the first terminal of the second resistor;
a fifth transistor having a control terminal, a first terminal coupled to the control terminal of the fifth transistor and the second terminal of the fourth transistor, and a second terminal coupled to the second terminal of the second transistor;
a switch having a control terminal, a first terminal, and a second terminal, the control terminal of the switch coupled to the second output terminal of the control circuitry, the second terminal of the switch coupled to the ground terminal;

a second current source having a first terminal coupled to the first terminal of the switch and a second terminal coupled to the control terminal of the second transistor;
a sixth transistor having a control terminal coupled to the control terminal of the fourth transistor, a first terminal coupled to the first terminal of the switch, and a second terminal coupled to the control terminal of the second transistor; and
a third resistor having a first terminal coupled to the second terminal of the second transistor and a second terminal coupled to the control terminal of the second transistor.

14. The system of claim 13, wherein the second transistor is a first n-channel transistor, and the fifth transistor is a second n-channel transistor matched to the first n-channel transistor.

15. The system of claim 12, wherein the resistor is a first resistor, the current source is a first current source, and the third driver includes:
a second resistor having a first terminal and a second terminal coupled to the supply terminal;
a fourth transistor having a control terminal, a first terminal, and a second terminal, the first terminal of the fourth transistor coupled to the control terminal of the fourth transistor and the first terminal of the second resistor;
a fifth transistor having a control terminal, a first terminal coupled to the control terminal of the fifth transistor and the second terminal of the fourth transistor, and a second terminal coupled to the second terminal of the third transistor;
a switch having a control terminal, a first terminal, and a second terminal, the control terminal of the switch coupled to the third output terminal of the control circuitry, the second terminal of the switch coupled to the supply terminal;
a second current source having a first terminal coupled to the first terminal of the switch and a second terminal coupled to the control terminal of the third transistor;
a sixth transistor having a control terminal coupled to the control terminal of the fourth transistor, a first terminal coupled to the first terminal of the switch, and a second terminal coupled to the control terminal of the third transistor; and
a third resistor having a first terminal coupled to the second terminal of the third transistor and a second terminal coupled to the control terminal of the third transistor.

16. The system of claim 15, wherein the third transistor is a first p-channel transistor, and the fifth transistor is a second p-channel transistor matched to the first p-channel transistor.

17. The system of claim 12, wherein:
the control terminal of the second driver is a first control terminal, and the second driver has a second control terminal and a fourth terminal;
the control terminal of the third driver is a first control terminal, and the third driver has a second control terminal and a fourth terminal;
the control circuitry has a fifth output terminal coupled to the second control terminal of the second driver and a sixth output terminal coupled to the second control terminal of the third driver; and
the system further includes:
a fourth transistor having a control terminal coupled to the fourth terminal of the second driver, a first terminal coupled to the second terminal of the resistor, and a second terminal coupled to the common mode voltage terminal; and a fifth transistor having a control terminal coupled to the fourth terminal of the third driver, a first terminal coupled to the common mode voltage terminal, and a second terminal coupled to the first terminal of the resistor.

18. The system of claim 17, wherein the resistor is a first resistor, the current source is a first current source, and the second driver includes:

a second resistor having a first terminal and a second terminal coupled to the ground terminal;

a sixth transistor having a control terminal, a first terminal, and a second terminal, the first terminal of the sixth transistor coupled to the control terminal of the sixth transistor and the first terminal of the second resistor;

a seventh transistor having a control terminal, a first terminal coupled to the control terminal of the seventh transistor and the second terminal of the sixth transistor, and a second terminal coupled to the second terminal of the fourth transistor;

a switch having a control terminal, a first terminal, and a second terminal, the control terminal of the switch coupled to the fifth output terminal of the control circuitry, the second terminal of the switch coupled to the ground terminal;

a second current source having a first terminal coupled to the first terminal of the switch and a second terminal coupled to the control terminal of the fourth transistor;

an eighth transistor having a control terminal coupled to the control terminal of the sixth transistor, a first terminal coupled to the first terminal of the switch, and a second terminal coupled to the control terminal of the fourth transistor; and a third resistor having a first terminal coupled to the second terminal of the fourth transistor and a second terminal coupled to the control terminal of the fourth transistor.

19. The system of claim 17, wherein the resistor is a first resistor, the current source is a first current source, and the third driver includes:

a second resistor having a first terminal and a second terminal coupled to the supply terminal;

a sixth transistor having a control terminal, a first terminal, and a second terminal, the first terminal of the sixth transistor coupled to the control terminal of the sixth transistor and the first terminal of the second resistor;

a seventh transistor having a control terminal, a first terminal coupled to the control terminal of the seventh transistor and the second terminal of the sixth transistor, and a second terminal coupled to the second terminal of the fifth transistor;

a switch having a control terminal, a first terminal, and a second terminal, the control terminal of the switch coupled to the sixth output terminal of the control circuitry, the second terminal of the switch coupled to the supply terminal;

a second current source having a first terminal coupled to the first terminal of the switch and a second terminal coupled to the control terminal of the fifth transistor;

an eighth transistor having a control terminal coupled to the control terminal of the sixth transistor, a first terminal coupled to the first terminal of the switch, and a second terminal coupled to the control terminal of the fifth transistor; and a third resistor having a first terminal coupled to the second terminal of the fifth transistor and a second terminal coupled to the control terminal of the fifth transistor.

20. The system of claim 12, wherein the second driver is matched to the third driver.

21. The system of claim 12, wherein the communication bus terminal is a first communication bus terminal, the current source is a first current source, the current mirror is a first current mirror, the resistor is a first resistor, and the system includes:

a second current source having a first terminal;

a second current mirror having a first terminal and a second terminal coupled to the first terminal of the second current source;

a fourth transistor having a control terminal, a first terminal coupled to a second communication bus terminal, and a second terminal coupled to the first terminal of the second current mirror;

a fourth driver having a first terminal coupled to the control terminal of the fourth transistor;

a second resistor having a first terminal and a second terminal coupled to the first terminal of the fourth transistor;

a fifth transistor having a control terminal, a first terminal coupled to the common mode voltage terminal, and a second terminal coupled to the first terminal of the second resistor;

a fifth driver having a first terminal coupled to the ground terminal, a second terminal coupled to the second terminal of the fifth transistor, and a third terminal coupled to the control terminal of the fifth transistor;

a sixth transistor having a control terminal, a first terminal coupled to the second terminal of the second resistor, and a second terminal coupled to the common mode voltage terminal; and a sixth driver having a first terminal coupled to the supply terminal, a second terminal coupled to the second terminal of the sixth transistor, and a third terminal coupled to the control terminal of the sixth transistor, the second driver, the third driver, the fifth driver, and the sixth driver being matched.

\* \* \* \* \*